(12) United States Patent
Jo et al.

(10) Patent No.: US 11,503,586 B2
(45) Date of Patent: Nov. 15, 2022

(54) METHOD AND DEVICE FOR PERFORMING COMMUNICATION WITH A PARENT NODE OR CHILD NODE BASED ON FIRST AND SECOND ALLOCATION INFORMATION

(71) Applicant: LG Electronics Inc., Seoul (KR)

(72) Inventors: Soonki Jo, Seoul (KR); Huayue Song, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/636,300

(22) PCT Filed: Aug. 7, 2019

(86) PCT No.: PCT/KR2019/009892
§ 371 (c)(1),
(2) Date: Feb. 3, 2020

(87) PCT Pub. No.: WO2020/032580
PCT Pub. Date: Feb. 13, 2020

(65) Prior Publication Data
US 2021/0153189 A1 May 20, 2021

(30) Foreign Application Priority Data
Aug. 7, 2018 (KR) .................. 10-2018-0091876
Nov. 2, 2018 (KR) .................. 10-2018-0133803

(51) Int. Cl.
*H04W 72/04* (2009.01)
*H04W 72/08* (2009.01)

(52) U.S. Cl.
CPC ..... *H04W 72/0426* (2013.01); *H04W 72/042* (2013.01); *H04W 72/0446* (2013.01);
(Continued)

(58) Field of Classification Search
CPC .......... H04W 72/0426; H04W 72/042; H04W 72/0446; H04W 72/0453; H04W 72/0493;
(Continued)

(56) References Cited

U.S. PATENT DOCUMENTS

2004/0228304 A1   11/2004   Riedel et al.
2012/0258749 A1   10/2012   Lenzini et al.
(Continued)

FOREIGN PATENT DOCUMENTS

| KR | 1020140077327 | 6/2014 |
| KR | 20140129911 | 11/2014 |
| WO | WO2018084952 | 5/2018 |

OTHER PUBLICATIONS

JP Office Action in Japanese Appln. No. 2020-511155, dated Mar. 23, 2021, 4 pages (with English translation).
(Continued)

*Primary Examiner* — Mewale A Ambaye
(74) *Attorney, Agent, or Firm* — Fish & Richardson P.C.

(57) ABSTRACT

Provided are a node operation method in a wireless communication system and an apparatus using the method. The method includes receiving first allocation information related to communication with a parent node and second allocation information related to communication with a child node and performing communication with the parent node or child node based on the first and the second allocation information. The first allocation information informs of resource type of a specific resource as one of three, and the second allocation information informs of resource type of the specific resource as one of seven. When the second allocation information informs the specific resource as a hard resource which can be always used for communication
(Continued)

with the child node, the specific resource is used for communication with the child node irrespective of the first allocation information.

18 Claims, 30 Drawing Sheets

(52) U.S. Cl.
CPC ... *H04W 72/0453* (2013.01); *H04W 72/0493* (2013.01); *H04W 72/082* (2013.01)

(58) Field of Classification Search
CPC ............. H04W 72/082; H04W 84/047; H04W 72/0406; H04W 72/1247; H04B 7/155; H04B 7/15507; H04B 7/15542; H04B 7/2606
See application file for complete search history.

(56) References Cited

U.S. PATENT DOCUMENTS

| | | | |
|---|---|---|---|
| 2015/0349942 A1 | 12/2015 | Chatteijee et al. | |
| 2018/0092139 A1 | 3/2018 | Novlan et al. | |
| 2018/0192412 A1 | 7/2018 | Novlan et al. | |
| 2019/0110268 A1* | 4/2019 | Abedini | H04B 7/2606 |
| 2019/0289502 A1* | 9/2019 | Abedini | H04W 28/26 |
| 2019/0349079 A1* | 11/2019 | Novlan | H04B 7/15542 |
| 2020/0100124 A1* | 3/2020 | Hampel | H04B 7/15528 |
| 2020/0351874 A1* | 11/2020 | Luo | H04B 7/15542 |
| 2021/0022136 A1* | 1/2021 | Kimba Dit Adamou | H04W 72/0446 |

OTHER PUBLICATIONS

LG Electronics, "Discussions on access and backhaul link multiplexing and timing," R1-1812566, 3GPP TSG RAN WG1 Meeting #95, Spokane, US, dated Nov. 12-16, 2018, 5 pages.

ZTE, "Discussion on IAB node resource allocation," R2-1810215, 3GPP TSG-RAN WG2 NR AdHoc 1807, Montreal, Canada, dated Jul. 2-6, 2018, 4 pages.

LG Electronics, "Discussions on NR IAB support", R1-1806649, 3GPP TSG RAN WG1 Meeting #93, Busan, Korea, May 21-25, 2018, 12 pages.

ZTE, "Discussion on IAB node initial access process", R1-1806026, 3GPP TSG RAN WG1 Meeting #93, Busan, Korea, May 21-25, 2018, 10 pages.

ZTE, "Overview of physical layer enhancements for IAB", R1-1806024, 3GPP TSG RAN WG1 Meeting #93, Busan, Korean, May 21-25, 2018, 9 pages.

Taiwan Office Action in Taiwan Appln. No. 108127942, dated Apr. 17, 2020, 26 pages (with English translation).

Ericsson, "Updated summary of 7.2.3.1 Enhancements to support NR backhaul links," R1-1812042, 3GPP TSG RAN WG1 Meeting #94bis, Chengdu, China, dated Oct. 8-12, 2018, 22 pages.

Extended European Search Report in European Application No. 19839241.7, dated Aug. 14, 2020, 8 pages.

Huawei, HiSilicon, "Physical layer enhancement on IAB," R1-1803695, 3GPP TSG RAN WG1 Meeting #92bis, Sanya, China, dated Apr. 16-20, 2018, 6 pages.

Korean Notice of Allowance in Korean Application No. 10-2019-0096203, dated Sep. 28, 2020, 11 pages (with English translation).

Qualcomm Incorporated, "IAB resource partitioning for architecture group 1," R2-1808006, 3GPP TSG-RAN WG2 Meeting #102, Busan, South Korea, dated May 21-25, 2018.

Qualcomm Incorporated, "IAB topology adaptation for architecture group 1," R3-183731, 3GPP TSG-RAN WG3 Meeting #AH1807, Montreal, Canada, dated Jul. 2-6, 2018, 8 pages.

Qualcomm Incorporated, "Resource Coordination across IAB Topology," R2-1808007, 3GPP TSG-RAN WG2 Meeting #102, Busan, South Korea, dated May 21-25, 2018, 6 pages.

Vivo, "Discussion on IAB node access and resource allocation," R2-1809864, 3GPP TSG-RAN WG2 NR AH1807 Meeting, Montreal, Canada, dated Jul. 2-6, 2018, 3 pages.

* cited by examiner

METHOD AND DEVICE FOR PERFORMING COMMUNICATION WITH A PARENT NODE OR CHILD NODE BASED ON FIRST AND SECOND ALLOCATION INFORMATION

CROSS-REFERENCE TO RELATED APPLICATIONS

This application is a National Stage application under 35 U.S.C. § 371 of International Application No. PCT/KR2019/009892, filed on Aug. 7, 2019, which claims the benefit of Korean Patent Applications No. 10-2018-0091876 filed on Aug. 7, 2018, and No. 10-2018-0133803 filed on Nov. 2, 2018. The disclosures of the prior applications are incorporated by reference in their entirety.

FIELD OF THE DISCLOSURE

The present disclosure relates to wireless communication and, more particularly, to a node operation method in a wireless communication system and an apparatus using the method.

RELATED ART

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications.

A communication system considering services or terminals vulnerable to reliability or latency has also been discussed, and a next-generation RAT considering improved mobile broadband communication, massive MTC, ultra-reliable and low latency communication (URLLC), and the like, may also be termed a new RAT or new radio (NR).

The next-generation wireless communication system such as NR may introduce Bandwidth Part (BWP). The BWP may be used by a broadband wireless communication system to allocate part of bandwidth to terminals having difficulty in using the broadband.

Meanwhile, NR may use broader bandwidth than the Long Term Evolution (LTE) and also use massive Multi-Input Multi-Output (MIMO), multi-beams.

Also, NR may introduce Integrated Access and Backhaul (IAB). Here access may be a base station-terminal, and backhaul may be base station to base station or base station to core network. In NR, access and backhaul may use different radio resources/radio channels but may also use the same radio resources and/or radio channels. For example, a radio resource and radio channel used for a first base station to serve terminals connected through an access link may also be used for a backhaul link between the first base station and a second base station.

Here, terms such as a base station and terminal are used for the purpose of convenience and may be replaced with another term such as a node. For example, suppose the second base station controls/schedules a terminal connected to the first base station through an access link via a backhaul link to the first base station. In this case, the second base station may be referred to as a parent node or donor node from the viewpoint of the first base station while the terminal may be referred to as a child node. And the first base station may also be referred to as a relay node or IAB node.

In the IAB environment, communication between a base station and a terminal may be performed only through an access link but may also be performed through both the access link and backhaul link. As a result, resource scheduling is needed, which takes into account both the access and backhaul links. And a method for reducing unnecessary interference between an access and backhaul links for the aforementioned scheduling and an apparatus using the method are needed.

SUMMARY OF THE DISCLOSURE

An object of the present disclosure is to provide a node operation method in a wireless communication system and an apparatus using the method.

In an aspect, provided is a node operation method in a wireless communication system. The method includes receiving first allocation information related to communication with a parent node and second allocation information related to communication with a child node and performing communication with the parent node or child node based on the first and the second allocation information. The first allocation information informs of resource type of a specific resource as one of three, and the second allocation information informs of resource type of the specific resource as one of seven. When the second allocation information informs the specific resource as a hard resource which can be always used for communication with the child node, the specific resource is used for communication with the child node irrespective of the first allocation information.

The first allocation information may inform of resource type of the specific resource as one of downlink, uplink, and flexible.

The second allocation information may inform of resource type of the specific resource as one of hard downlink, soft downlink, hard uplink, soft uplink, hard flexible, soft flexible, and not-available.

The hard downlink may indicate that the specific resource is a resource that is always available for the node to transmit a signal to the child node, and the soft downlink may indicate that the specific resource is a resource for which transmission of a signal by the node to the child node is controlled by the parent node.

The hard uplink may indicate that the specific resource is a resource that is always available for the node to receive a signal from the child node, and the soft uplink may indicate that the specific resource is a resource for which reception of a signal by the node from the child node is controlled by the parent node.

The hard flexible may indicate that the specific resource is always a flexible resource in a relationship between the node and the child node, and the soft flexible may indicate that the specific resource is a resource for which whether the specific resource is a flexible resource in a relationship between the node and the child node is controlled by the parent node.

The not-available may indicate that the specific resource is a resource that is not used in a relationship between the node and the child node.

If the second allocation information informs of a resource as soft downlink, soft uplink, or soft flexible, and if the resource is allocated to the node according to the first allocation information, the resource may be regarded as being used for communication with the parent node.

If the second allocation information informs of a resource as soft downlink, soft uplink, or soft flexible, and if the resource is not allocated to the node according to the first allocation information, the resource may be regarded as being used for communication with the child node.

The first and the second allocation information may be received from the parent node.

The child node may be a UE connected to the node.

When the second allocation information indicates a resource as soft downlink, soft uplink, or soft flexible, if no particular explicit or implicit indication about availability of the resource for communication with the child node is provided, the resource may be used for communication with the parent node.

In another aspect, provided is a node. The node includes a transceiver transmitting and receiving a radio signal and a processor operating in conjunction with the transceiver. The processor is configured to: receive first allocation information related to communication with a parent node and second allocation information related to communication with a child node and perform communication with the parent node or child node based on the first and the second allocation information. The first allocation information informs of resource type of a specific resource as one of three, and the second allocation information informs of resource type of the specific resource as one of seven. When the second allocation information indicates the specific resource as a hard resource which can be always used for communication with the child node, the specific resource is used for communication with the child node irrespective of the first allocation information.

In still another aspect, provided is a method for operating a parent node in a wireless communication system. The method includes transmitting first allocation information related to communication with a node and second allocation information related to communication between the node and a child node of the node and performing communication with the node based on the first and the second allocation information. The first allocation information informs of resource type of a specific resource as one of three, and the second allocation information informs of resource type of the specific resource as one of seven. When the specific resource is indicated by the second allocation information as a hard resource which can be always available for the node to communicate with the child node, the specific resource is used for communication between the node and the child node irrespective of the first allocation information.

The present disclosure provides an efficient scheduling method in the IAB environment by allocating resources to both of an access and backhaul links. Also, in the event of collision between resource allocation for the access and backhaul links, the present disclosure clearly specifies according to which method the collision has to be resolved, thereby preventing ambiguity from being occurred and at the same time, preventing unnecessary interference from being generated.

DESCRIPTION OF EXEMPLARY EMBODIMENTS

Figure 1:
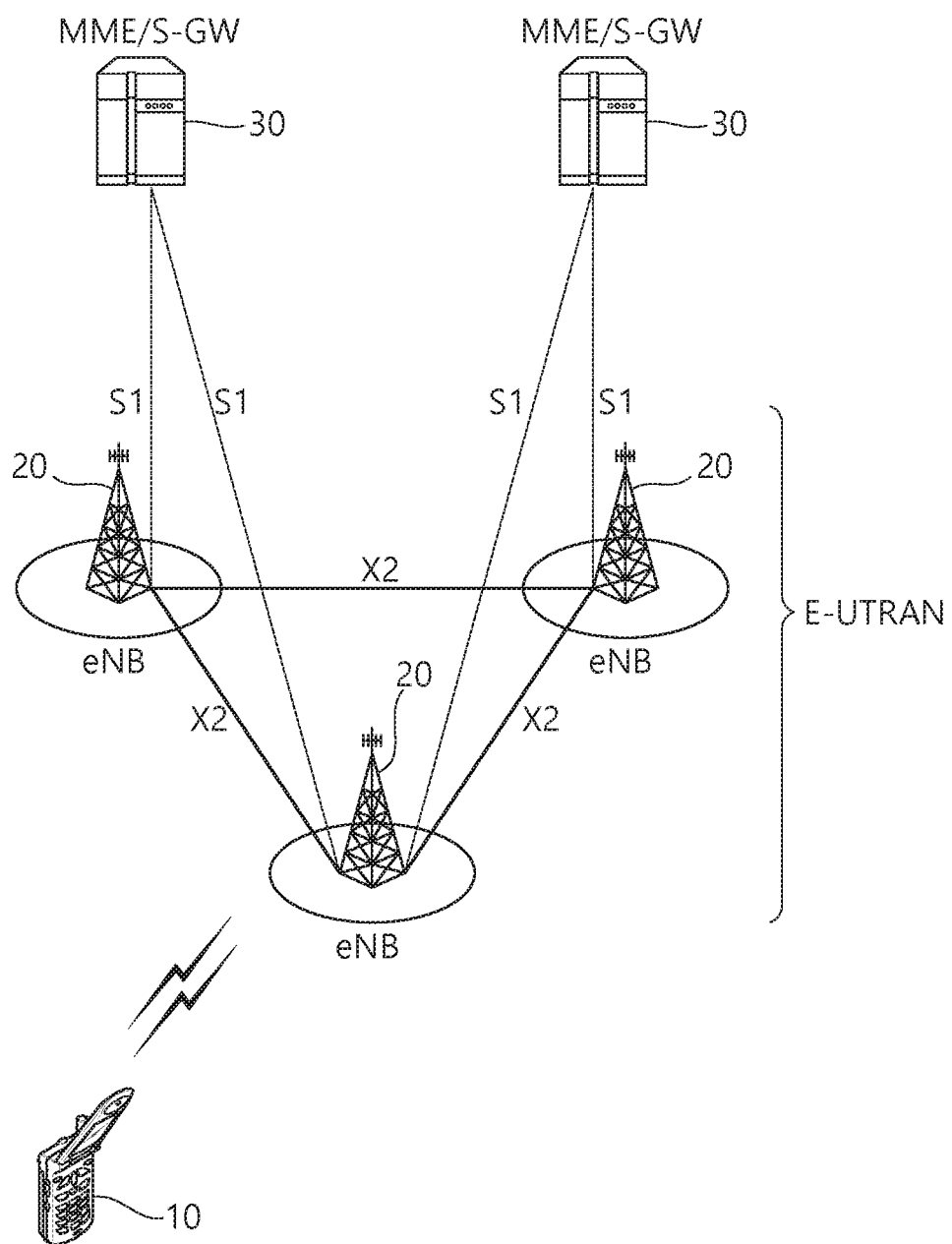
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
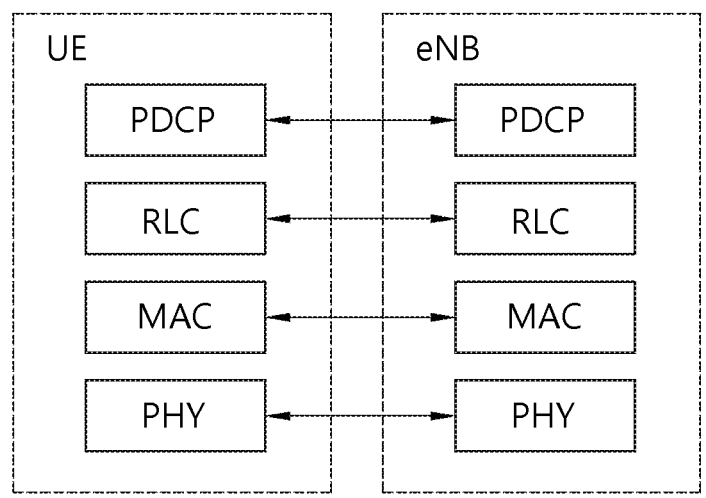
FIG. 2 is a diagram showing a radio protocol architecture for a user plane.
Figure 3:
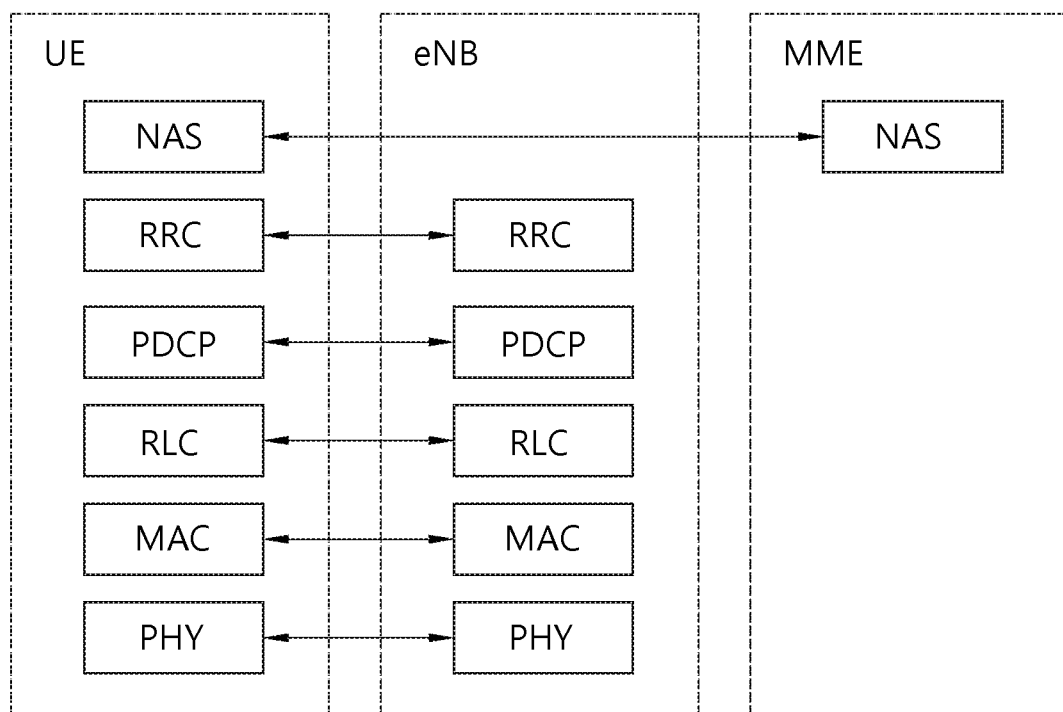
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) or new radio (NR) will be described.

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications. In addition, a communication system design considering services or terminals vulnerable to reliability or latency has also been discussed. An introduction of a next-generation RAT considering enhanced mobile broadband communication, massive MTC, ultra-reliable and low latency communication (URLLC), and the like, has been discussed, and in this disclosure, for the purposes of description, the corresponding technology will be termed new RAT or new radio (NR).

Figure 4:
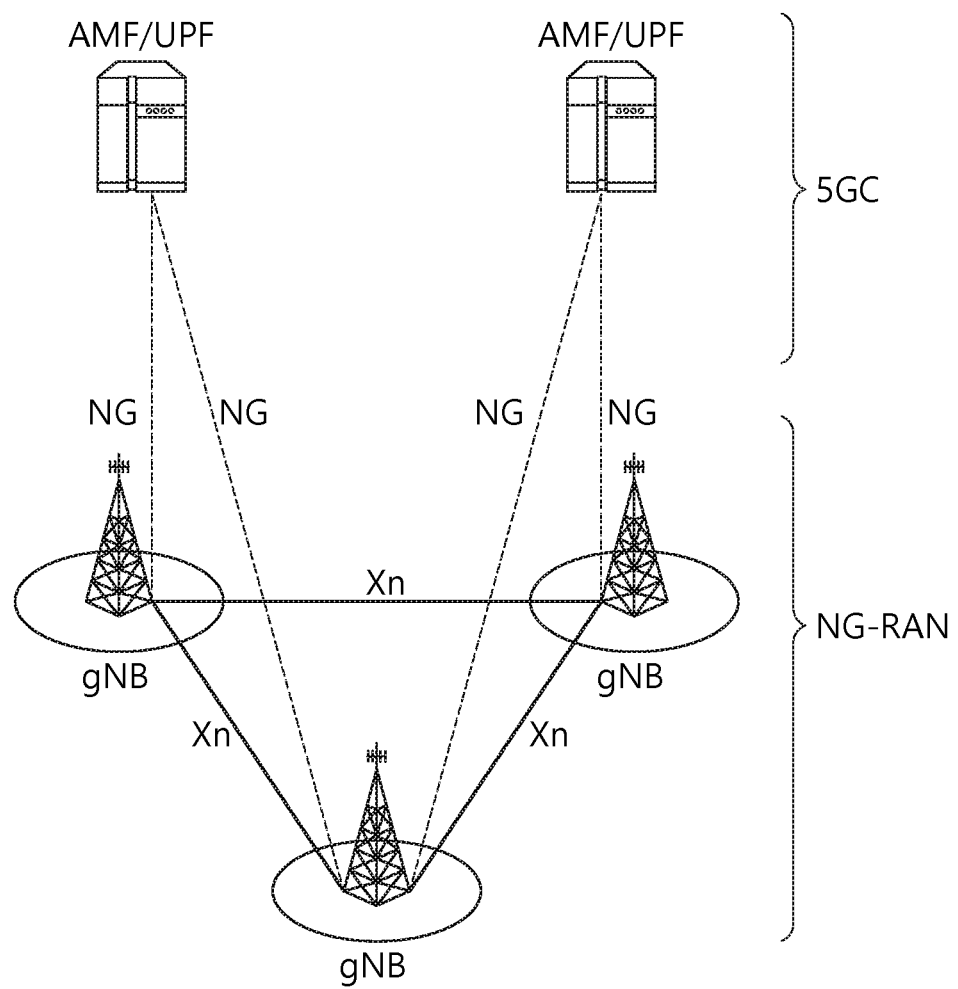
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like.

Figure 5:
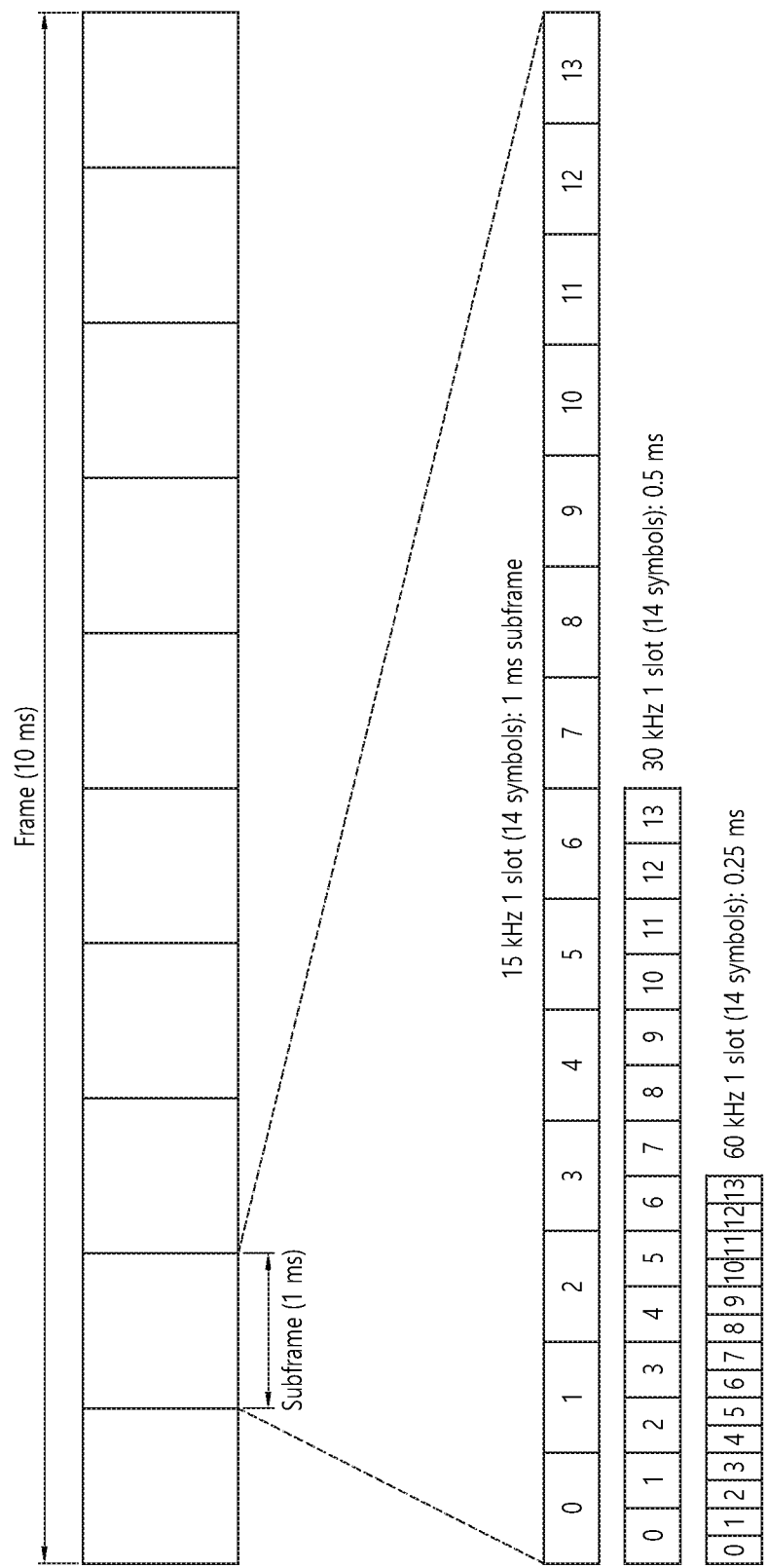
FIG. 5 illustrates a frame structure that may be applied in NR.

FIG. 5 illustrates a frame structure that may be applied in NR.

Referring to FIG. 5, a frame may be composed of 10 milliseconds (ms) and include 10 subframes each composed of 1 ms. Various fields in the time domain may be represented by the time unit $T_c=1/(\Delta f_{max} \cdot N_f)$, where $\Delta f_{max}=480 \times 10^3$ Hz, and $N_f=4096$.

A carrier component may have one set of frames in the uplink and another set of frames in the downlink. Transmission of an uplink frame i may be started before the start of the corresponding downlink frame i by $T_{TA}=(N_{TA}+N_{TA,offset})T_c$.

One or a plurality of slots may be included in a subframe according to subcarrier spacings.

The following table illustrates a subcarrier spacing configuration.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Extended |
| 4 | 240 | normal |

The table 2-1 below shows the number of slots within a frame $N_{slot}^{frame,\mu}$, number of slots within a subframe $N_{slot}^{frame,\mu}$, and number of symbols within a slot $N_{symb}^{slot}$ according to the subcarrier spacing configuration μ in the case of normal Cyclic Prefix (CP). The table 2-2 below shows the number of slots within a frame $N_{slot}^{frame,\mu}$, number of slots within a subframe $N_{slot}^{frame,\mu}$, and number of symbols within a slot $N_{symb}^{slot}$ according to the subcarrier spacing configuration μ in the case of extended CP.

TABLE 2-1

| μ | $N_{symb}^{slot}$ | $N_{slot}^{frame\,\mu}$ | $N_{slot}^{subframe\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |

TABLE 2-1-continued

| μ | $N_{symb}^{slot}$ | $N_{slot}^{frame\,\mu}$ | $N_{slot}^{subframe\,\mu}$ |
|---|---|---|---|
| 4 | 14 | 160 | 16 |
| 5 | 14 | 320 | 32 |

TABLE 2-2

| μ | $N_{symb}^{slot}$ | $N_{slot}^{frame\,\mu}$ | $N_{slot}^{subframe\,\mu}$ |
|---|---|---|---|
| 2 | 12 | 40 | 4 |

FIG. 5 illustrates cases for μ=0, 1, 2.

A slot may include a plurality of Orthogonal Frequency Division Multiplexing (OFDM) symbols. A plurality of OFDM symbols within a slot may be divided into downlink (denoted by D), flexible (denoted by X), and uplink (denoted by U) symbols. The format of the slot may be determined according to which of the D, X, and U OFDM symbols constitute the slot.

The table below illustrates one example of the slot format.

TABLE 3

| for-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | X | X | X | X | X | X | U | U | U |
| 45 | D | D | D | D | D | X | X | U | U | U | U | U | U | U |
| 46 | D | D | D | D | D | X | U | D | D | D | D | D | X | U |

TABLE 3-continued

| for-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56-255 | Reserved | | | | | | | | | | | | | |

A UE may be configured with the format of a slot through an upper layer signal, DC, or a combination of the upper layer signal and DCI.

An antenna port is defined so that a channel transmitting a symbol on the antenna port may be inferred from a channel transmitting other symbol on the same antenna port. If large part of characteristics of a channel to which a symbol on one antenna port is transmitted may be inferred from a channel to which a symbol on another antenna port is transmitted, the two antenna ports are said to be quasi co-located. The large part of characteristics may include at least one or more of delay spread, Doppler spread, Doppler shift, average gain, average delay, and spatial Rx parameters.

A resource grid may be defined to include a specific number of subcarriers and OFDM symbols with respect to each numerology and subcarrier, which may start from a common resource block indicated by upper layer signaling.

Each element of the resource grid with respect to configuration of an antenna port and subcarrier spacing is called a resource element (RE), which may support complex values.

A resource block (RB) may be defined as contiguous subcarriers (for example, 12) in the frequency domain. A reference resource block may be numbered from zero to higher numbers in the frequency domain. The subcarrier 0 of the reference resource block 0 may be denoted by 'reference point A' and may be applied commonly to all of the subcarrier spacing configurations. Also, the reference point A may be used as a reference point for other resource block grids, where the reference point A may be obtained from an upper layer parameter.

A common resource block may be numbered from 0 to higher numbers in the frequency domain for subcarrier spacing configuration. The subcarrier 0 of the common resource block 0 for subcarrier spacing configuration may coincide with the 'reference point A'.

A physical resource block and virtual resource block may be defined within the part of subcarrier bandwidth and may be numbered from 0 to higher numbers.

According to carrier aggregation, up to 15 secondary cells may be aggregated in addition to a primary cell. In other words, up to 16 serving cells may be aggregated for a UE.

A physical downlink control channel (PDCCH) may include one or more control channel elements (CCEs) as illustrated in the following table.

TABLE 4

| Aggregation level | Number of CCEs |
|---|---|
| 1 | 1 |
| 2 | 2 |

TABLE 4-continued

| Aggregation level | Number of CCEs |
|---|---|
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 6:
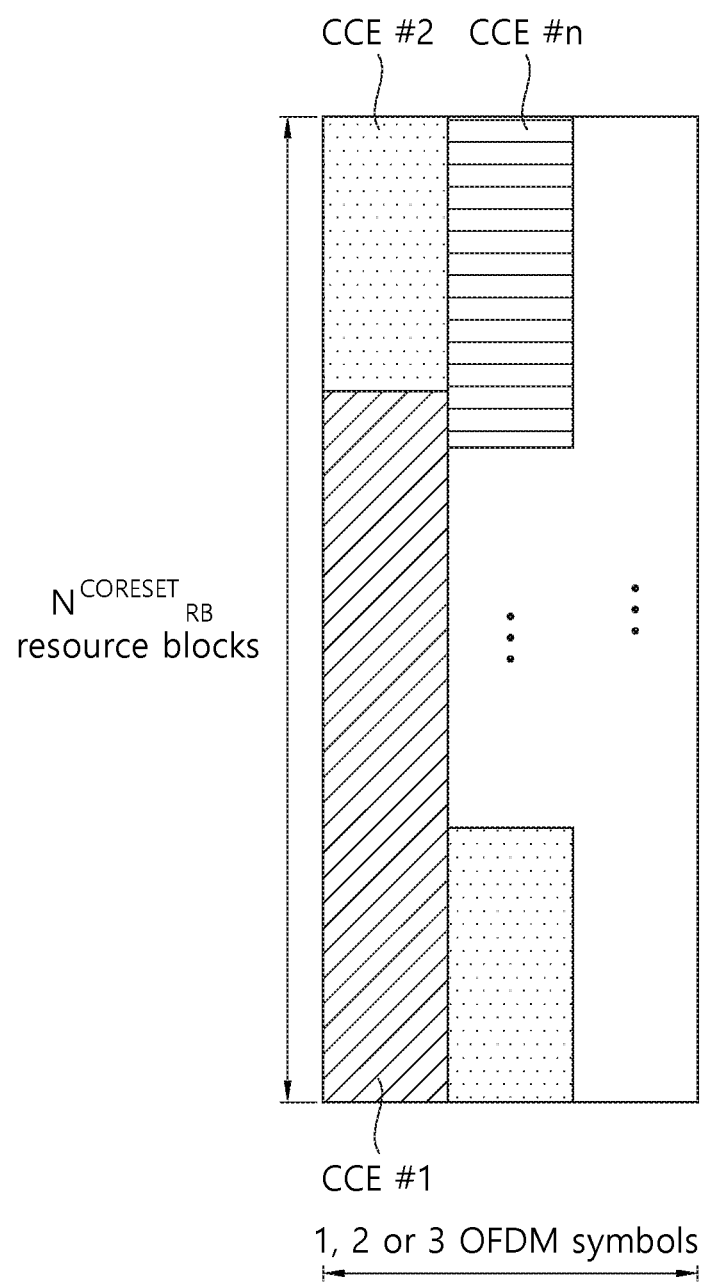
FIG. 6 illustrates CORESET.

FIG. 6 illustrates CORESET.

Referring to FIG. 6, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 6, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 7:
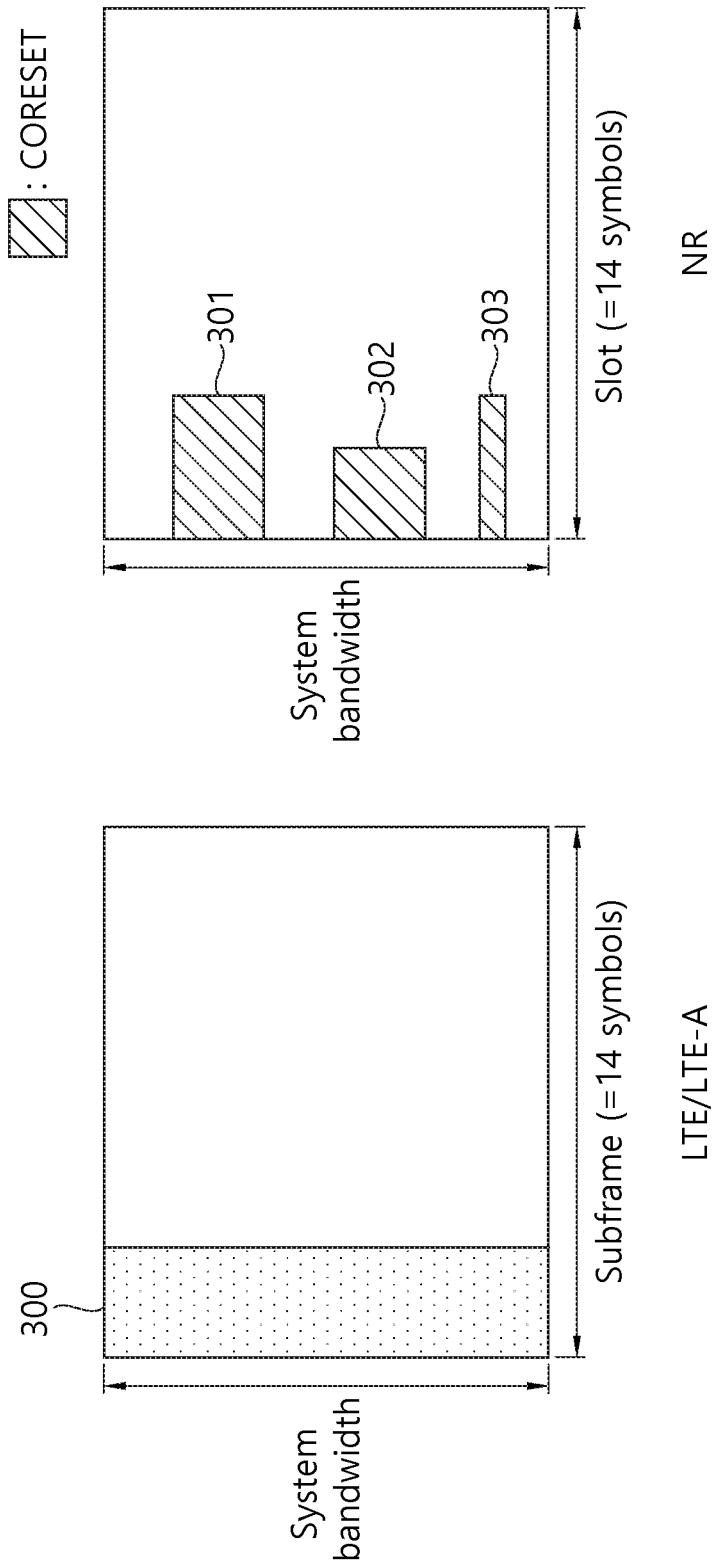
FIG. 7 is a diagram illustrating a difference between a related art control region and the CORESET in NR.

FIG. 7 is a diagram illustrating a difference between a related art control region and the CORESET in NR.

Referring to FIG. 7, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

In contrast, the future wireless communication system introduces the CORESET described above. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 7, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Figure 8:
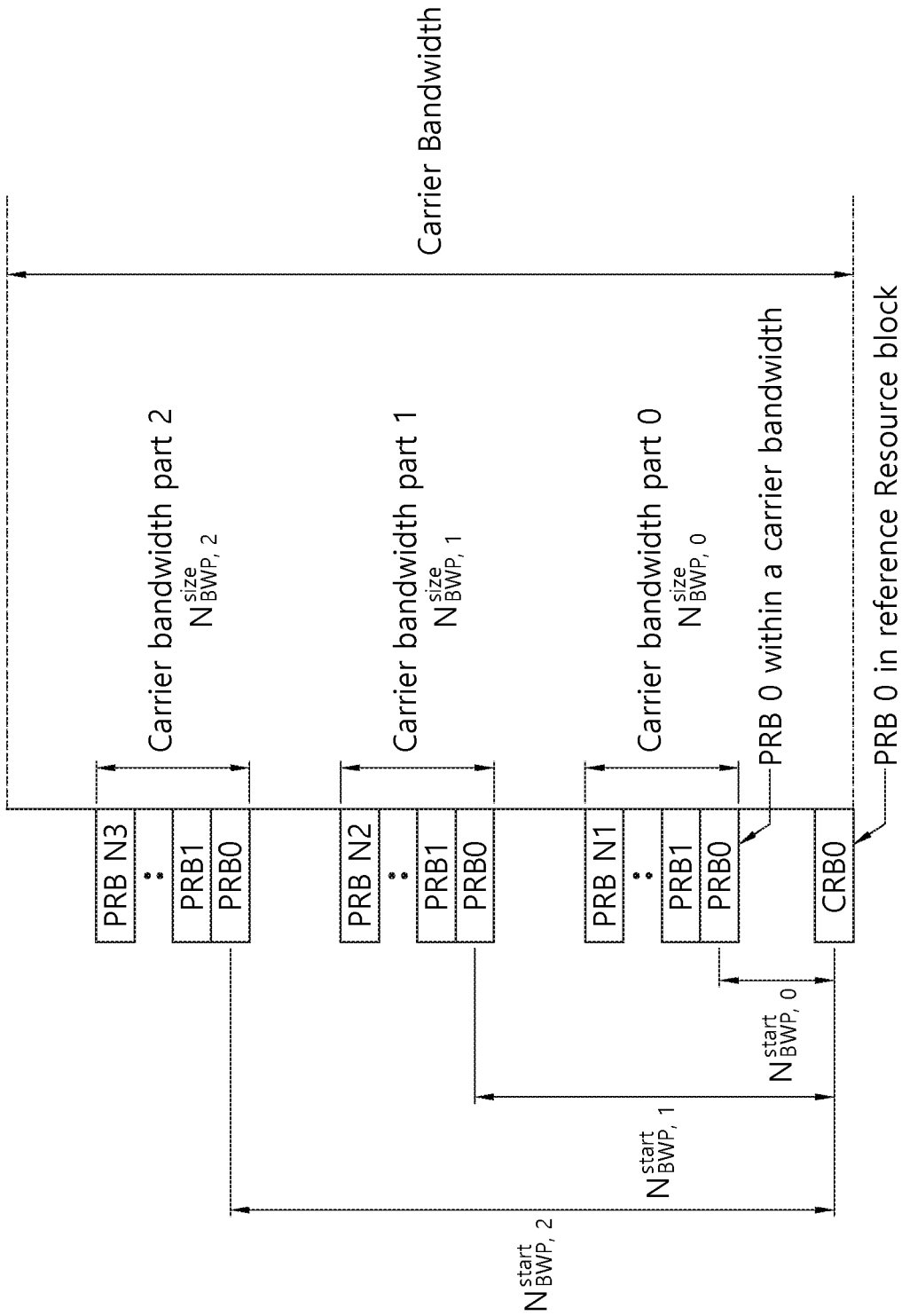
FIG. 8 illustrates carrier bandwidth part newly introduced to NR.

FIG. 8 illustrates carrier bandwidth part newly introduced to NR.

Referring to FIG. 8, the carrier bandwidth part may be simply called bandwidth part (BWP). As described above, in a future wireless communication system, various numerologies (for example, various subcarrier spacings) may be supported for the same subcarrier. NR may define a Common Resource Block (CRB) for a given numerology at a particular subcarrier.

The bandwidth part is a set of contiguous physical resource blocks (PRBs) selected among contiguous sub-sets of common resource blocks (CRBs) for a given numerology at a given subcarrier.

As shown in FIG. 8, a common resource block may be determined according to a numerology for particular subcarrier bandwidth, namely according to which subcarrier spacing is used. A common resource block may be indexed (from 0) from the lowest frequency of the subcarrier bandwidth, and a resource grid (which may be referred to as a common resource block resource grid) that uses the common resource block as its constituting unit may be defined.

The bandwidth part may be indicated with reference to a CRB that has the lowest index (let this be CRB 0). CRB 0 having the lowest index may also be called point A.

For example, for a given numerology at a particular subcarrier, the i-th bandwidth part may be indicated by $N_{BWP,i}^{start}$ and $N_{BWP,i}^{size}$. $N_{BWP,i}^{start}$ may indicate a start CRB of the i-th BWP with reference to CRB 0, and $N_{BWP,i}^{start}$ may indicate the size of the i-th BWP in the frequency domain (for example, in PRB units). PRBs within each BWP may be indexed from 0. The index of a CRB within each BWP may be mapped to the index of a PRB. For example, the CRB index may be mapped so that $n_{CRB} = n_{PRB} + N_{BWP,i}^{start}$.

Although a UE may be configured with up to 4 downlink bandwidth parts for downlink transmission, only one downlink bandwidth part may be activated at a given time point. A UE does not expect to receive PDSCH, PDCCH, or CSI-RS except for the activated downlink bandwidth part among the downlink bandwidth parts. Each downlink bandwidth part may include at least one CORESET.

Although a UE may be configured with up to 4 uplink bandwidth parts for uplink transmission, only one uplink bandwidth part may be activated at a given time point. A UE does not transmit PUSCH or PUCCH except for the activated uplink bandwidth part among the uplink bandwidth parts.

Compared with conventional systems, NR operates on broadband; however, not all of UEs may be able to support the broadband communication. BWP may be regarded as a feature that enables a UE incapable of supporting the broadband communication to operate on the broadband.

A UE configured to operate in the BWP of a serving cell may be configured with up to 4 bandwidth part (BWP) sets by an upper layer for the serving cell.

An initial activation DL BWP may be defined by the positions and the number of PRBs adjacent to a control resource set for type 0-PDCCH common search space, subcarrier spacing, and CP. For the operation in the primary cell, a UE may receive upper layer parameters for a random access procedure.

In the case of unpaired spectrum operation, a UE may expect that the center frequency of DL BWP is the same as the center frequency of UL BWP.

In what follows, resource allocation type will be described. Resource allocation type specifies a method for a scheduler (for example, gNB) to allocate resource blocks for each transmission. For example, when a gNB allocates a band composed of a plurality of resource blocks to a UE, the gNB may inform of resource blocks allocated to the UE through a bitmap consisting of bits corresponding to the respective resource blocks of the band. In this case, a disadvantage is obtained that although flexibility of resource allocation is improved, the amount of information required for the resource allocation is increased.

Taking into account the advantage and disadvantage, the following 3 resource allocation types may be defined/used.

1) Resource allocation type 0 refers to a method that allocates resources by using a bitmap, where each bit of the bitmap indicates a resource block group (RBG) rather than a resource block. In other words, in the resource allocation type 0, resource allocation is performed in resource block group units rather than at the resource block level. The table below shows the size of an employed RBG when the system bandwidth comprises $N_{RB}$ resource blocks.

TABLE 5

| System Bandwidth $N_{RB}^{DL}$ | RBG Size (P) |
|---|---|
| ≤10 | 1 |
| 11-24 | 2 |
| 25-63 | 6 |
| 64-110 | 12 |

2) Resource allocation type 1 refers to a method that allocates resources in RBG subset units. One RBG subset may be composed of a plurality of RBGs. For example, RBG subset #0 may consist of RBG #0, 3, 6, 9, . . . ; RGB subset #1 may consist of RBG #1, 4, 7, 10, . . . ; and RGB subset #2 may consist of RBG #2, 5, 8, 11, . . . . The number of RBGs belonging to one RBG subset is set to be the same as the number of resource blocks (RBs) belonging to one RBG. The resource allocation type 1 informs of which RBG subset is used among RBG subsets and which RB is used within an employed RBG subset.

3) Resource allocation type 2 refers to a method that allocates resources by informing of the start position (RB number) of an allocated band and the number of contiguous resource blocks. The contiguous resource blocks may be started from the start position. However, contiguous resource blocks are not necessarily limited to physical contiguity; rather, it may also indicate contiguity of a logical or virtual resource block index.

In a future wireless communication system, the number of resource blocks comprising an RBG (or a group of RBs) may be changed flexibly. At this time, information about the corresponding RBG, for example, information that indicates the number of resource blocks comprising an RBG may be transmitted through an upper layer signal such as scheduling DCI or a third physical layer (L1) signaling or an RRC message.

Also, in a future wireless communication system, resource allocation information (for example, the information about RBG) may include information about the time domain in addition to the frequency domain; and which information is included or in which way the information is included in the resource allocation information may also be changed flexibly.

In what follows, a physical channel and signal transmission process will be described.

Figure 9:
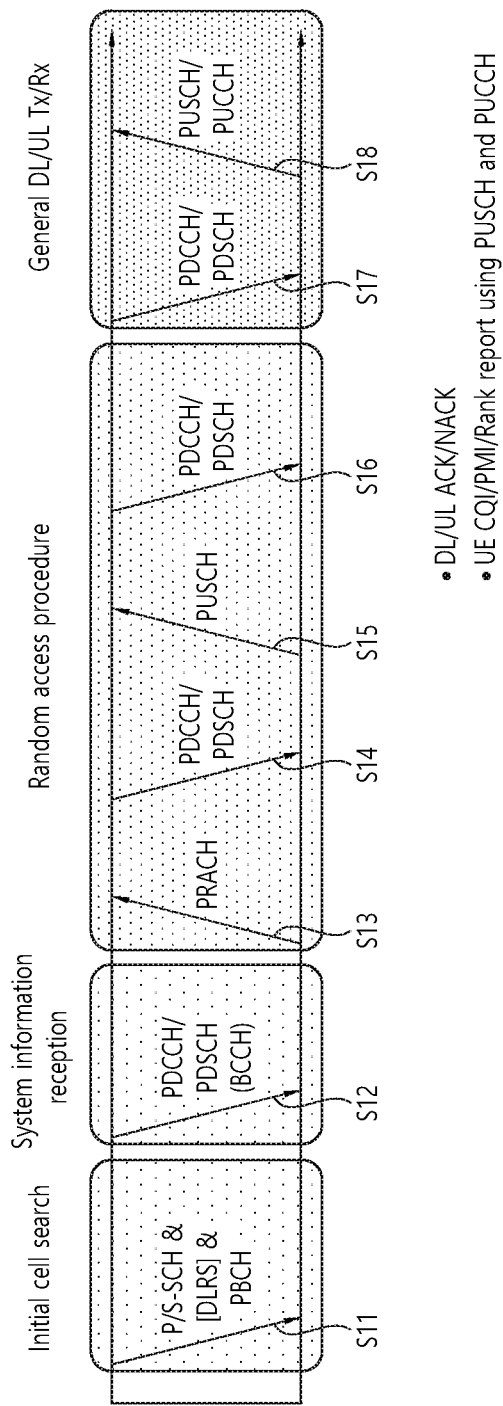
FIG. 9 illustrates physical channels and a normal signal transmission process in the 3GPP system.

FIG. 9 illustrates physical channels and a normal signal transmission process in the 3GPP system.

In a wireless communication system, a UE receives information through a downlink (DL) from a gNB, and the UE transmits information to the gNB via an uplink (UL). Information transmitted and received between the gNB and UE includes data and various pieces of control information; and various physical channels are employed according to the type/intended use of the information transmitted and received between them.

When a UE wakes up from the power-off state or newly enters a cell, the UE performs an initial cell search operation such as synchronization to a gNB S11. To this purpose, the UE may synchronize to the gNB by receiving Primary Synchronization Channel (PSCH) and Secondary Synchronization Channel (SSCH) from the gNB and obtain information such as cell identity (ID). Also, the UE may obtain information broadcast within the cell by receiving a Physical Broadcast Channel (PBCH) from the gNB. Also, the UE may check the downlink channel state by receiving a Downlink Reference Signal (DL RS) at the initial cell search phase.

A UE that has complete the initial cell search may obtain more specific system information by receiving a Physical Downlink Control Channel (PDCCH) and a Physical Downlink Shared Channel (PDSCH) corresponding to the PDCCH.

Afterwards, the UE may perform a random access procedure to complete access to the gNB S13-S16. More specifically, the UE may transmit a preamble through a Physical Random Access Channel (PRACH) S13 and receive a Random Access Response (RAR) with respect to the preamble through the PDCCH and the PDSCH corresponding to the PDCCH S14. Afterwards, the UE may transmit a Physical Uplink Shared Channel (PUSCH) by using scheduling information within the RAR S15 and perform a contention resolution procedure by using the PDCCH and the PDSCH corresponding to the PDCCH S16.

The UE that has performed the procedure above may subsequently perform PDCCH/PDSCH reception S17 and PUSCH/Physical Uplink Control Channel (PUCCH) transmission S18 as a normal uplink/downlink signal transmission procedure. The control information transmitted to the gNB by the UE is called Uplink Control Information (UCI). UCI includes Hybrid Automatic Repeat and reQuest Acknowledgement/Negative-ACK (HARQ ACK/NACK), scheduling request (SR), channel state information (CSI), and so on. CSI includes Channel Quality Indicator (CQI), Precoding Matrix Indicator (PMI), Rank Indication (RI), and so on. UCI is usually transmitted via a PUCCH but may also be transmitted through a PUSCH when both of control information and data needs to be transmitted simultaneously. Also, according to a request/indication of the network, the UE may transmit the UCI non-periodically through the PUSCH.

In what follows, cell search will be described.

Cell search is a procedure in which a UE obtains time and frequency synchronization with respect to a cell and detects a physical layer cell ID of the cell. To perform the cell search, the UE receives a Primary Synchronization Signal (PSS) and a Secondary Synchronization Signal (SSS).

The UE may assume that reception occasions of a PBCH, PSS, and SSS are distributed over contiguous symbols and form an SS/PBCH block. The UE may assume that SSS, PBCH DM-RS, and PBCH data have the same EPRE. The UE may assume that the ratio of SSS EPRE to PSS EPRE is 0 dB or 3 dB in an SS/PBCH block of the corresponding cell.

The cell search procedure of the UE may be summarized as shown in Table A.

TABLE A

| | Signal Type | Operation |
|---|---|---|
| Step 1 | PSS | Acquisition of SS/PBCH block (SSB) symbol timing<br>Search cell ID group for cell ID (3 hypothesis) |
| Step 2 | SSS | Detect cell ID group (336 hypothesis) |
| Step 3 | PBCH DMRS | SSB index and half-frame index (Detect slot and frame boundary) |
| Step 4 | PBCH | Time information (80 ms, SFN, SSB index, HF)<br>Configure RMSI CORESET/search space |
| Step 5 | PDCCH and PDSCH | Cell access information<br>RACH configuration |

Figure 10:
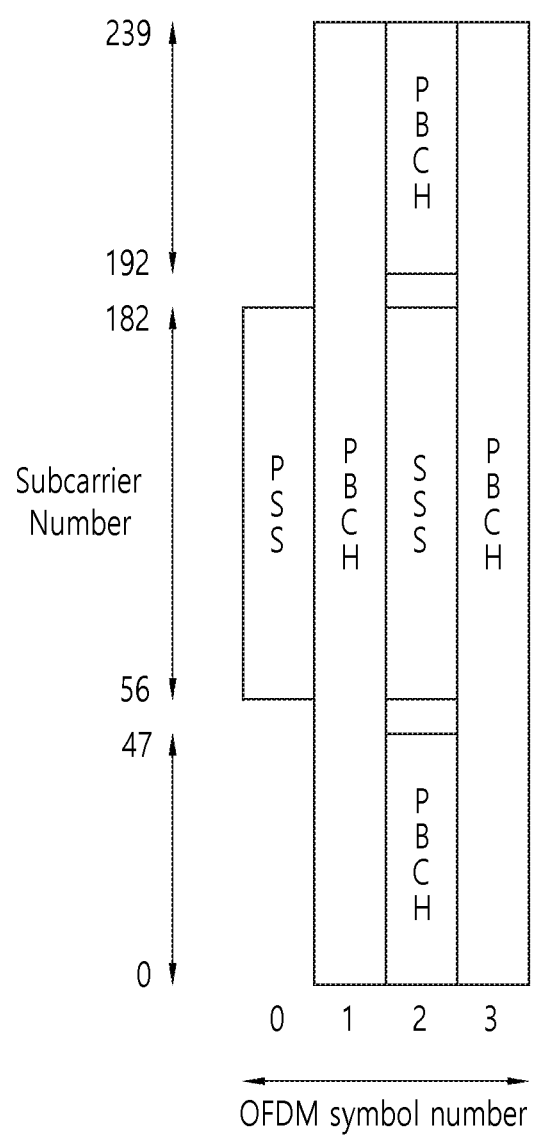
FIG. 10 illustrates a synchronization signal and PBCH (SS/PBCH) block.

FIG. 10 illustrates a synchronization signal and PBCH (SS/PBCH) block.

According to FIG. 10, an SS/PBCH block spans a PSS and SSS, which occupies one symbol and 127 subcarriers respectively, 3 OFDM symbols, and 240 subcarriers; however, on one symbol, the remaining PBCH may occupy the unused part of the SSS. Periodicity of an SS/PBCH block may be configured by the network, and the time point at which an SS/PBCH block may be transmitted is determined by subcarrier spacing.

Polar coding may be applied to the PBCH. Unless the network configures a UE to assume that a different subcarrier spacing is used, the UE may assume that a band-specific subcarrier spacing is used for the SS/PBCH block.

PBCH symbols may carry their own frequency-multiplexed DMRS. QPSK modulation may be used for the PBCH.

1008 unique physical layer cell IDs may be given by the equation 1 below.

$$N_{ID}^{cell}=3N_{ID}^{(1)}+N_{ID}^{(2)}, \text{ where } N_{ID}^{(1)} \in \{0,1,\ldots,335\} \text{ and } N_{ID}^{(2)} \in \{0,1,2\}. \quad [\text{Eq. 1}]$$

Meanwhile, a PSS sequence $d_{PSS}(n)$ for the PSS may be defined by the equation 2 below.

$$d_{PSS}(n)=1-2x(m)$$

$$m=(n+43N_{ID}^{(2)})\bmod 127, 0 \leq n < 127, \quad [\text{Eq.2}]$$

where $x(i+7)=(x(i+4)+x(i))\bmod 2$ and $[x(6)\ x(5)\ x(4)\ x(3)\ x(2)\ x(1)\ x(0)]=[1\ 1\ 1\ 0\ 1\ 1\ 0]$.

The sequence may be mapped to the physical resource shown in FIG. 10.

Meanwhile, an SSS sequence $d_{SSS}(n)$ for the SSS may be defined by the equation 3 below.

$$d_{SSS}(n) = [1 - 2x_0((n+m_0)\bmod 127)][1 - 2x_1((n+m_1)\bmod 127)] \quad [\text{Eq. 3}]$$

$$m_0 = 15\left\lfloor\frac{N_{ID}^{(1)}}{112}\right\rfloor + 5N_{ID}^{(2)}$$

$$m_1 = N_{ID}^{(1)} \bmod 112$$

$$0 \leq n < 127$$

-continued $$\left\{\text{Here,} \begin{array}{l} x_0(i+7) = (x_0(i+4) + x_0(i)) \bmod 2 \\ x_1(i+7) = (x_1(i+1) + x_1(i)) \bmod 2 \end{array} \text{and} \right.$$

$$\left. \begin{array}{l} [x_0(6) \ x_0(5) \ x_0(4) \ x_0(3) \ x_0(2) \ x_0(1) \ x_0(0)] = [0 \ 0 \ 0 \ 0 \ 0 \ 0 \ 1] \\ [x_1(6) \ x_1(5) \ x_1(4) \ x_1(3) \ x_1(2) \ x_1(1) \ x_1(0)] = [0 \ 0 \ 0 \ 0 \ 0 \ 0 \ 1] \end{array} \right\}$$

The sequence may be mapped to the physical resource shown in FIG. 10.

For a half frame having an SS/PBCH block, the first symbol indexes for candidate SS/PBCH blocks may be determined according to the subcarrier spacing of the SS/PBCH blocks described later.

Case A—subcarrier spacing 15 kHz: First symbols of candidate SS/PBCH blocks have an index of {2, 8}+14*n. For a subcarrier frequency below 3 GHz, n=0, 1. For a subcarrier frequency above 3 GHz and below 6 GHz, n=0, 1, 2, 3.

Case B—subcarrier spacing 30 kHz: First symbols of candidate SS/PBCH blocks have an index of {4, 8, 16, 20}+28*n. For a subcarrier frequency below 3 GHz, n=0. For a subcarrier frequency above 3 GHz and below 6 GHz, n=0, 1.

Case C—subcarrier spacing 30 kHz: First symbols of candidate SS/PBCH blocks have an index of {2, 8}+14*n. For a subcarrier frequency below 3 GHz, n=0, 1. For a subcarrier frequency above 3 GHz and below 6 GHz, n=0, 1, 2, 3.

Case D—subcarrier spacing 120 kHz: First symbols of candidate SS/PBCH blocks have an index of {4, 8, 16, 20}+28*n. For a subcarrier frequency above 6 GHz, n=0, 1, 2, 3, 5, 6, 7, 8, 10, 11, 12, 13, 15, 16, 17, 18.

Case E—subcarrier spacing 240 kHz: First symbols of candidate SS/PBCH blocks have an index of {8, 12, 16, 20, 32, 36, 40, 44}+56*n. For a subcarrier frequency above 6 GHz, n=0, 1, 2, 3, 5, 6, 7, 8.

Candidate SS/PBCH blocks within a half frame may be indexed from 0 to L−1 in the ascending order along the time axis. A UE has to determine 2 LSB bits of the SS/PBCH block index when L=4 and 3 LSB bits when L>4 for each half frame from one-to-one mapping to the index of the DM-RS sequence transmitted within the PBCH. When L=64, the UE has to determine 3 MSB bits of the SS/PBCH block index for each half frame according to the PBCH payload bit $\bar{a}_{\bar{A}+5}, \bar{a}_{\bar{A}+6}, \bar{a}_{\bar{A}+7}$.

The UE may be configured by an upper layer parameter SSB-transmitted-SIB1 with indexes of SS/PBCH blocks in which the UE is unable to receive other signals or channels within REs overlapped with the REs corresponding to the SS/PBCH blocks. Also, the UE may be configured by an upper layer parameter SSB-transmitted with indexes of SS/PBCH blocks for each serving cell in which the UE is unable to receive other signals or channels within REs overlapped with the REs corresponding to the SS/PBCH blocks. Configuration by the SSB-transmitted may precede the configuration by the SSB-transmitted-SIB1. The UE may be configured with periodicity of a half frame with respect to reception of SS/PBCH blocks for each serving cell by an upper layer parameter SSB-periodicityServingCell. If the periodicity of a half frame with respect to reception of SS/PBCH blocks is not configured for the UE, the UE may assume periodicity of the half frame. The UE may assume that the periodicity is the same for all of SS/PBCH blocks within a serving cell.

Figure 11:
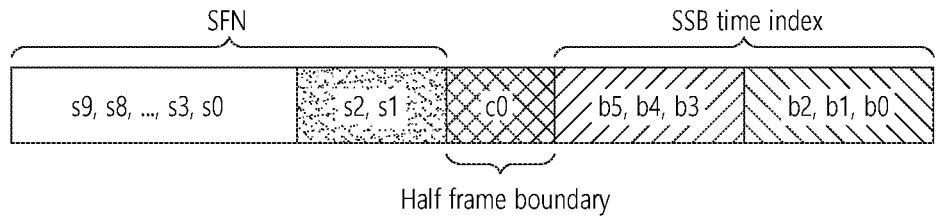
FIG. 11 illustrates a method for a UE to obtain timing information.

FIG. 11 illustrates a method for a UE to obtain timing information.

First, the UE may obtain 6-bit SFN information through a Master Information Block (MIB) received within the PBCH. Also, the UE may obtain 4-bit SFN within the PBCH transmission block.

Second, the UE may obtain a 1-bit half frame indicator as part of the PBCH payload. Below 3 GHz, the half frame indicator may be implicitly signaled as part of a PDBH DMRS with respect to $L_{max}$=4.

Lastly, the UE may obtain an SS/PBCH block index from a DMRS sequence and PBCH payload. In other words, the UE may obtain 3 LSB bits of the SS block index from the DMRS sequence during the period of 5 ms. Also, (above 6 GHz) 3 MSB bits of timing information may be carried explicitly within the PBCH payload.

In the initial cell selection process, the UE may assume that a half frame having SS/PBCH blocks are generated with periodicity of 2 frames. If an SS/PBCH block is detected, and $k_{SSB}$≤23 for FR1 and $k_{SSB}$≤11 for FR2, the UE determines that there exists a control resource set for Type0-PDCCH common search space. If $k_{SSB}$>23 for FR1 and $k_{SSB}$>11 for FR2, the UE determines that there does not exist a control resource set for Type0-PDCCH common search space.

For a serving cell that does not transmit SS/PBCH blocks, the UE obtains time and frequency synchronization to the serving cell based on reception of SS/PBCH blocks on a Pcell or PSCell of a cell group to which the serving cell belongs In what follows, random access (RA) will be described.

Before starting a physical random access procedure, layer 1 has to receive a set of SS/PBCH block indexes and provide a set of RSRP measurements to the upper layer.

Before starting the physical random access procedure, the layer 1 has to receive the following information from the upper layer:

Configuration of PRACH transmission parameter (PRACH preamble format, time resource, and frequency resource for PRACH transmission) and Parameter for determination of a root sequence and cyclic shift within a PRACH preamble sequence set with respect to the parameter (index of a logical root sequence table, cyclic shift (NCS), and set type (unrestricted set, restricted set A, or restricted set B).

In view of the physical layer, the L random access procedure includes a random access preamble (Msg1) within a PRACH, random access response (RAR) at the PDCCH/PDSCH (Msg2), and transmission of the PDSCH for transmission of the PUSCH and resolution of contention if applicable (Msg3).

If the random access procedure is started by a PDCCH order from the UE, transmission of a random access preamble may have the same subcarrier spacing with that for transmission of a random access preamble initiated by the upper layer.

If the UE is configured with two uplink carriers with respect to a serving cell and the UE detects the PDCCH order, the UE may use an UL/SUL indicator field value from the PDCCH order detected for determining an uplink subcarrier for transmission of the corresponding random access preamble.

The random access procedure of the UE may be summarized as shown in Table 6.

TABLE 6

| | Signal type | Operation/Obtained information |
|---|---|---|
| Step 1 | PRACH preamble of uplink | Initial acquisition of beam<br>Random election of RA-preamble ID |
| Step 2 | Random access response on DL-SCH | Timing array information<br>RA-preamble ID<br>Initial uplink grant, temporary C-RNTI |
| Step 3 | Uplink transmission on UL-SCH | RRC connection request<br>UE identifier |
| Step 4 | Contention resolution of downlink | C-RNTI on the PDCCH with respect to the initial access<br>C-RNTI on the PDCCH with respect to the UE in RRC_CONNECTED state |

Figure 12:
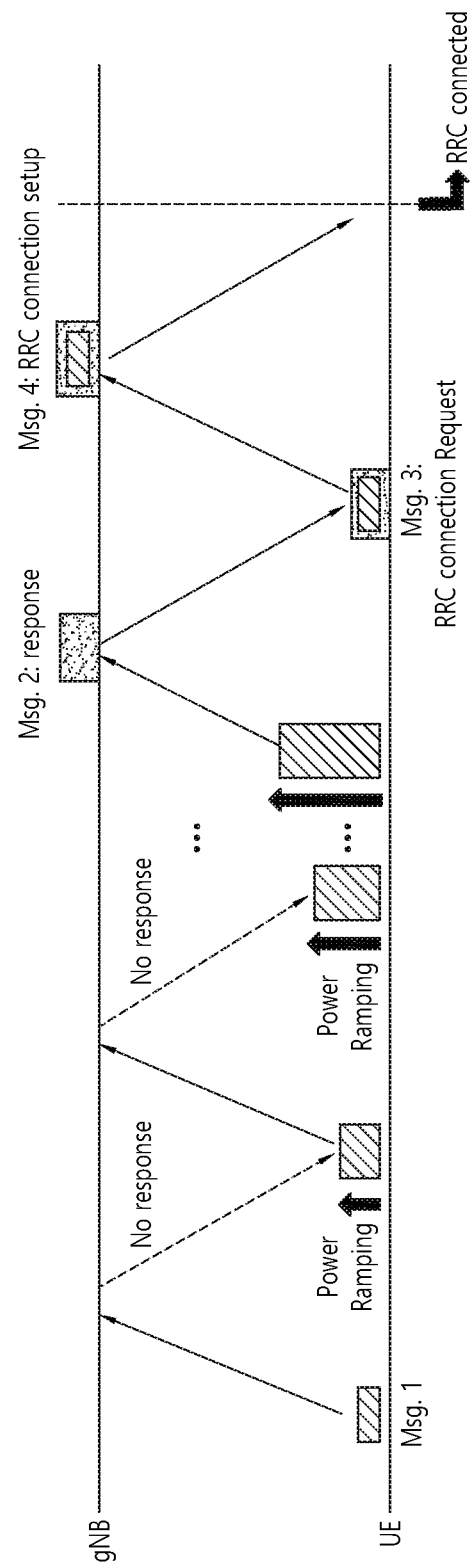
FIG. 12 illustrates a random access procedure.

FIG. 12 illustrates a random access procedure.

Referring to FIG. 12, first, the UE may transmit a PRACH preamble to the uplink as message 1 (Msg 1) of the random access procedure.

A random access preamble sequence having two different lengths may be supported. A long sequence having a length of 839 is applied to the subcarrier spacing of 1.25 kHz and 5 kHz; and a short sequence having a length of 139 is applied to the subcarrier spacing of 15, 30, 60, and 120 kHz. The long sequence may support an unrestricted set and restricted sets of type A and B while the short sequence may support only the unrestricted set.

A plurality of PACH preamble formats are defined by one or more RACH OFDM symbols, different cyclic prefix (CP), and guard time. Configuration of a PRACH preamble to be used is transmitted to the UE as system information.

If there is no response for Msg 1, the UE may retransmit a power-wrapped PRACH preamble within a specified number of trials. The UE calculates PRACH transmission power for retransmission of a preamble based on the most recent estimated path loss and power wrapping counter. If the UE performs beam switching, the power wrapping counter does not change.

Figure 13:
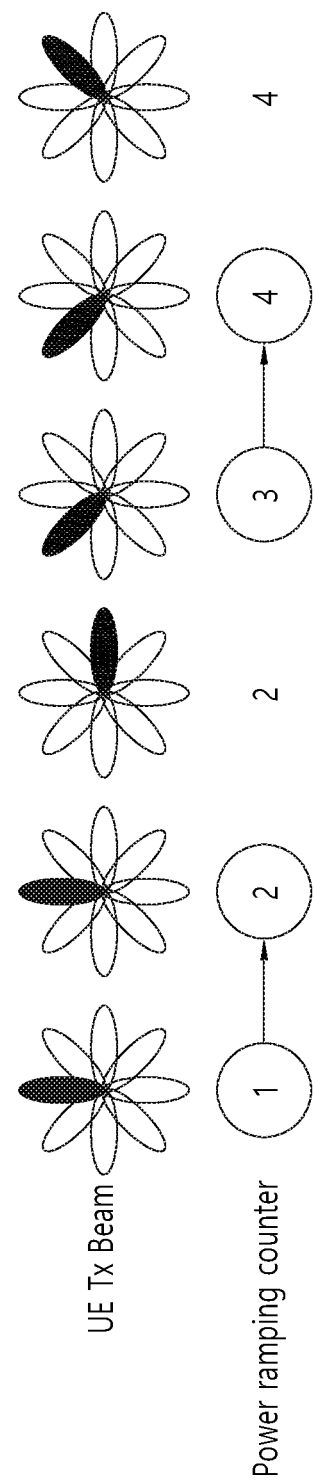
FIG. 13 illustrates a power wrapping counter.

FIG. 13 illustrates a power wrapping counter.

The UE may perform power wrapping for retransmission of a random access preamble based on the power wrapping counter. Here, as described above, the power wrapping counter does not change when the UE performs beam switching at the time of retransmission of a PRACH.

According to FIG. 13, if the UE retransmits a random access preamble for the same beam as when the power wrapping counter is increased from 1 to 2 and 3 to 4, the UE increases the power wrapping counter by 1. However, if the beam is changed, the power wrapping counter may not change at the time of retransmission of the PRACH.

Figure 14:
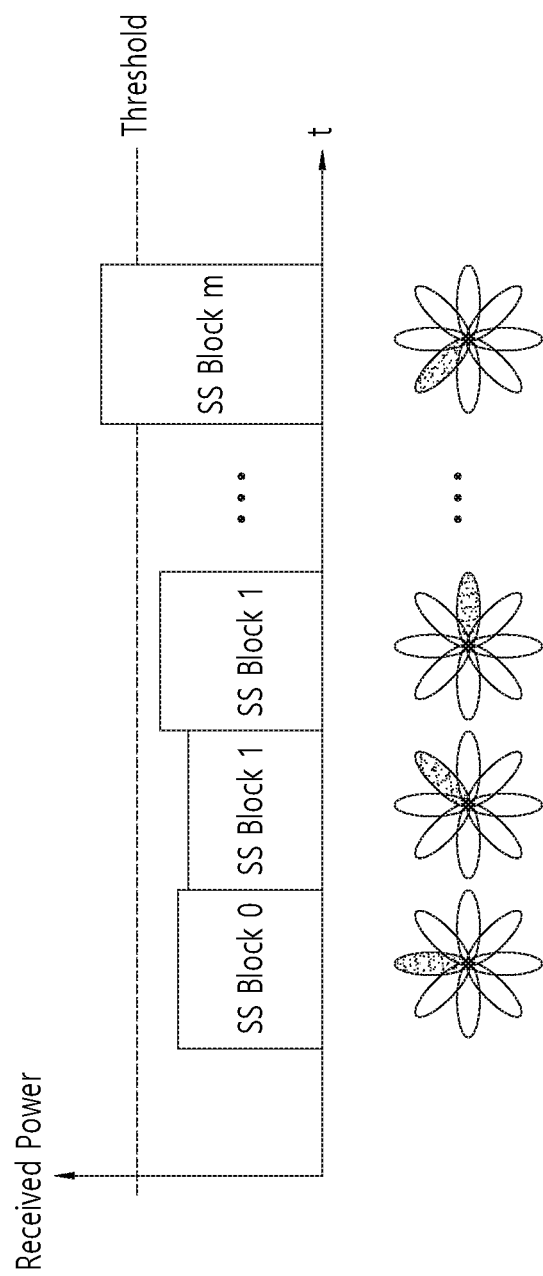
FIG. 14 illustrates a threshold for an SS block with respect to an RACH resource relationship.

FIG. 14 illustrates a threshold for an SS block with respect to an RACH resource relationship.

System information about a relationship between SS blocks and RACH resources may be informed to the UE. A threshold for an SS block with respect to an RACH resource relationship may be based on the RSRP and network configuration. Transmission or retransmission of an RACH preamble may be based on an SS block satisfying the threshold. Therefore, in the example of FIG. 14, since SS block m exceeds a threshold for reception power, the RACH preamble may be transmitted or retransmitted based on the SS block m.

Afterwards, if the UE receives a random access response on the DL-SCH, the DL-SCH may provide timing arrangement information, RA-preamble ID, initial uplink grant, and temporary C-RNTI.

Based on the information, the UE may perform uplink transmission of message 3 (Msg3) of the random access procedure on the UL-SCH. Msg3 may include an RRC connection request and UE identifier.

In response to the transmission, the network may transmit Msg4, which may be treated as a contention resolution message, to the downlink. By receiving the message, the UE may enter the RRC connection state.

In what follows, the random access preamble will be described in more detail.

In the random access preamble transmission step, the physical random access procedure may be triggered by an upper layer, PDCCH order, or request for PRACH transmission. Configuration of PRACH transmission by the upper layer may include the following:

Configuration about PRACH transmission; and
Preamble index, preamble subcarrier spacing, $P_{PRACH,target}$, corresponding RA-RNTI, and PRACH resource.

The preamble may be transmitted according to a selected PRACH format having transmission power of $P_{PRACH,b,f,c}(i)$ on the indicated PRACH resource.

A plurality of SS/PBCH blocks related to one PRACH occasion may be provided to the UE by the upper layer parameter SSB-perRACH-Occasion. If SSB-perRACH-Occasion is smaller than 1, one SS/PBCH block may be mapped to contiguous PRACH occasions 1/SSB-perRACH-Occasion. A plurality of preambles are provided to the UE for each SS/PBCH by the upper layer parameter cb-preamblePerSSB, and the UE may determine a multiple of SSB-perRACH-Occasion and the value of cb-preamblePerSSB as the total number of preambles for each PRACH and SSB.

The SS/PBCH block index may be mapped to the PRACH occasions according to the following order:

First, ascending order of a preamble index within a single PRACH occasion,
Second, ascending order of frequency resource index with respect to frequency multiplexed PRACH occasions,
Third, ascending order of time resource index with respect to time multiplexed PRACH occasions within the PRACH slot, and
Fourth, ascending order of index with respect to PRACH slots.

The period that starts from frame 0, at which SS/PBCH blocks are mapped to PRACH occasions, is the minimum value of the PRACH configuration periods {1, 2, 4}, which is larger than or equal to $[N_{Tx}^{SSB}/N_{PRACHperiod}^{SSB}]$; here, the UE obtains $N_{Tx}^{SSB}$ by the upper layer parameter SSB-transmitted-SIB1, and $N_{PRACHperiod}^{SSB}$ represents the number of SS/PBCH blocks that may be mapped to one PRACH configuration period.

If the random access procedure is started by the PDCCH order and is requested by the upper layer, the UE has to transmit the PRACH within the first available PRACH occasion, where the time difference between the last symbol at which the PDCCH order is received and the first symbol of PRACH transmission is larger than or equal to $N_{T,2}$+ $\Delta_{BWPSwitching}$+$\Delta_{Delay}$ msec. Here, $N_{T,2}$ represents duration of $N_2$ symbols corresponding to PUSCH preparation time with respect to PUSCH processing capability 1, $\Delta_{BWPSwitching}$ is a predefined value, and $\Delta_{Delay}$>0.

In what follows, the random access response will be described in more detail.

In response to the PRACH transmission, the UE may attempt to detect a PDCCH having the corresponding RA-RNTI during a window controlled by the upper layer. The window may start from the first symbol of the earliest control resource set configured for the UE with respect to the Type1-PDCCH common search space comprising at least ceil[($\Delta \cdot N_{slot}^{subframe} \cdot N_{symb}^{slot}$)/$T_{sf}$] symbols after the last symbol of preamble sequence transmission. The length of the windows as expressed in terms of the number of slots may be provided by the upper layer parameter rar-Window-Length based on the subcarrier spacing with respect to the Type0-PDCCH common search space.

If the UE detects a PDCCH having the corresponding RA-RNTI and the corresponding PDSCH including a DL-SCH transmission block within the window, the UE may transmit the transmission block to the upper layer. The upper layer may parse the transmission block with respect to the random access preamble identity (RAPID) related to the PRACH transmission. If the upper layer identifies RAPID within an RAR message(s) of the DL-SCH transmission block, the upper layer may indicate an uplink grant to the physical layer. This may be referred to as a random access response (RAR) uplink grant in the physical layer. If the upper layer fails to identify the RAPID related to the PRACH transmission, the upper layer may instruct the physical layer to transmit the PRACH. The minimum time difference between the last symbol at which the PDSCH is received and the first symbol of the PRACH transmission is the same as $N_{T,1}+\Delta_{new}+0.5$, where $N_{T,1}$ represents the duration of $N_{T,1}$ symbols corresponding to the PDSCH reception time with respect to the PDSCH processing capability 1 when an additional PDSCH DM-RS is configured, and $\Delta_{new} \geq 0$.

For a detected SS/PBCH block or received CSI-RS, the UE may have to receive the corresponding PDSCH including a PDCCH having the corresponding RA-RNTI and a DL-SCH transmission block having the same DM-RS antenna port Quasi Co-Location (QCL) characteristics. If the UE attempts to detect a PDCCH having the corresponding RA-RNTI as a response to PRACH transmission initiated by the PDCCH order, the UE may assume that the PDCCH and PDCCH order have the same DM-RS antenna port QCL characteristics.

The RAR uplink grant schedules PUSCH transmission of the UE (Msg3 PUSCH). Configuration of the RAR uplink grant, which starts from the MSG and ends at the LSB, may be given as shown in Table 7. Table 7 shows the size of a random access response grant configuration field.

TABLE 7

| RAR grant field | Number of bits |
| --- | --- |
| Frequency hopping flag | 1 |
| Msg3 PUSCH frequency resource allocation | 14 |
| Msg3 PUSCH time resource allocation | 4 |
| MCS | 4 |
| TPC command for Msg3 PUSCH | 3 |
| CSI request | 1 |
| Reserved bits | 3 |

Msg3 PUSCH frequency resource allocation is related to uplink resource allocation type 1. In the case of frequency hopping, based on the indication of the frequency hopping flag field, the first or first two bits $N_{UL,hop}$ of the Msg3 PUSCH frequency resource allocation field may be used as hopping information bits.

MCS may be determined by the first 16 indexes of the MCS index table applicable to the PUSCH.

The TPC command $\delta_{msg2,b,f,c}$ may be used for power configuration of the Msg3 PUSCH and may be interpreted according to Table 8 below.

TABLE 8

| TPC Command | Value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In a non-contention based random access procedure, the CSI request field is interpreted to determine whether a non-periodic CSI report is included in the corresponding PUSCH transmission. In the contention-based random access procedure, the CSI request field may be reserved.

As long as the UE does not configure the subcarrier spacing, the UE receives a subsequent PDSCH by using the subcarrier spacing that is the same as PDSCH reception that provides an RAR message.

If the UE does not detect a PDCCH having the corresponding RA-RNTI within a window and the corresponding DL-SCH transmission block, the UE performs a random access response reception failure procedure.

In what follows, the Msg3 PUSCH transmission will be described in more detail.

With respect to Msg3 PUSCH transmission, the upper layer parameter msg3-tp indicates whether the UE has to apply a transform precoding for the Msg3 PUSCH transmission. If the UE applies a transform precoding for Msg3 PUSCH transmission employing frequency hopping, the frequency offset for the second hop may be given as shown in Table 9. Table 9 illustrates a frequency offset of the second hop with respect to the Msg3 PUSCH transmission employing frequency hopping.

TABLE 9

| Number of PRBs in initial active UL BWP | Value of $N_{UL,hop}$ Hopping Bits | Frequency offset for 2nd hop |
| --- | --- | --- |
| $N_{BWP}^{size} < 50$ | 0 | $N_{BWP}^{size}/2$ |
| | 1 | $N_{BWP}^{size}/4$ |
| $N_{BWP}^{size} \geq 50$ | 00 | $N_{BWP}^{size}/2$ |
| | 01 | $N_{BWP}^{size}/4$ |
| | 10 | $-N_{BWP}^{size}/4$ |
| | 11 | Reserved |

The subcarrier spacing for Msg3 PUSCH transmission may be provided by the upper layer parameter msg3-scs. The UE has to transmit the PRACH and Msg3 PUSCH on the same uplink carrier of the same serving cell. The uplink BWP for the Msg3 PUSCH transmission may be indicated by SystemInformationBlockType1.

When the PDSCH and PUSCH have the same subcarrier spacing, the minimum time difference between the last symbol at which the PDSCH carrying the RAR is received and the first symbol of the corresponding Msg3 PUSCH transmission scheduled by the RAR within the PDSCH with respect to the UE may be the same as $N_{T,1}+N_{T,2}+N_{TA,max}+$ 0.5 msec. Here, $N_{T,1}$ represents the duration of $N_1$ symbols corresponding to the PDSCH reception with respect to the PDSCH processing capability 1 when an additional PDSCH DM-RS is configured, $N_{T,2}$ represents the duration of $N_2$ symbols corresponding to the PUSCH preparation time with respect to the PUSCH processing capability 1, and $N_{TA,max}$ represents the maximum timing adjustment value that may be provided by the TA command field within the RAR.

In what follows, contention resolution will be described in more detail.

If the UE fails to receive C-RNTI, the UE attempts to detect a PDCCH having the corresponding TC-RNTI that schedules a PDSCH including UE contention resolution identity in response to the Msg3 PUSCH transmission. In response to the reception of the PDSCH having the UE contention resolution identity, the UE transmits HARQ-ACK information within the PUCCH. The minimum time difference between the last symbol at which the PDSCH is received and the first symbol of the corresponding HARQ-ACK transmission is $N_T+0.5$ msec. $N_{T,1}$ represents the duration of $N_1$ symbols corresponding to the PDSCH reception with respect to the PDSCH processing capability 1 when an additional PDSCH DM-RS is configured.

In what follows, power saving will be described.

The battery life of a UE is an important factor of user experience that affects selection of a particular 5G handset and/or service. Since the NR system is capable of high speed data transfer, user data is expected to increase explosively and be provided in a very short time period.

Meanwhile, energy efficiency of a device is related to support for two aspects of efficient data transmission in the presence of a load and low energy consumption in the absence of data. Here, efficient data transmission in the presence of a load may be checked by average spectrum efficiency while low energy consumption in the absence of data may be estimated by a sleep ratio.

As power saving techniques for a UE, UE adaptation to traffic and power consumption pattern, adaption to the change of frequency/time, adaptation to antenna, adaptation to DRX configuration, adaptation to UE processing capability, adaptation for reduction of PDCCH monitoring/decoding, power saving signal/channel/procedure for triggering adaptation to UE power consumption, power consumption reduction in the RRM measurement, and so on may be taken into account.

Here, with respect to the adaptation to DRX configuration, a downlink-shared channel (DL-SCH) characterized by support for UE DRX that enables power saving and paging channel (PCH) (where a DRX period may be indicated by the network to the UE) characterized by support for UE DRX that enables power saving may be taken into account.

Also, with respect to the adaption to UE processing capability, the UE may report static UE wireless access capability at least when requested by the network. An gNB may inform the UE of which UE capability has to be reported based on band information. If allowed by the network, the UE may transmit, to the gNB, a temporary capability limit request for signaling possibility of a limited use of part of the capability (for example, due to hardware sharing, interference, or overheating). Afterwards, the gNB may confirm or reject the request. The temporary capability limit has to be transparent to 5GC. Static capabilities are mainly stored in the 5GC.

Also, with respect to the adaptation for reduction of PDCCH monitoring/decoding, the UE monitors a set of PDCCH candidates in the monitoring occasions configured within one or more CORESETs according to the corresponding search space configuration. A CORESET is composed of a set of PRBs having duration spanning 1 to 3 OFDM symbols. Resource Element Groups (REGs) and Control Channel Elements (CCEs), which are composed of resource units, are defined within a CORESET where each CCE is composed of one set of REGs. Control channels are formed by aggregation of CCEs. Different code rates for the control channels are implemented by aggregation of using a different number of CCEs. Mapping between interleaved and non-interleaved CCEs and REGs is supported within the CORESET.

Also, with respect to the power saving signal/channel/procedure for triggering adaptation to UE power consumption, when carrier aggregation (CA) is configured, to realize reasonable UE battery consumption, an activation/deactivation mechanism of cells is supported. If a cell is deactivated, the UE does not have to receive the corresponding PDCCH or PDSCH, and the UE is made incapable of transmitting the corresponding uplink transmission and does not have to perform CQI measurement, either. On the contrary, if a cell is activated, the UE has to receive the PDCCH and PDSCH (when the UE is configured to monitor the PDCCH from the SCell) and is expected to perform CQI measurement. NG-RAN ensures that SCells mapped to the PUCCH SCell are deactivated before the PUCCH SCell is modified or removed.

Also, with respect to the power consumption reduction in the RRM measurement, if two types of measurement are available, RRM configuration may include SSB about a reported cell(s) and beam measurement information related to CSI-RS (about layer 3 mobility).

Also, if carrier aggregation is configured, RRM configuration may include a list of best cells at the respective frequencies available with measurement information. Also, RRM measurement information may include beam measurement about listed cells belonging to a target gNB.

In what follows, Discontinuous Reception (DRX), which is one of techniques that may be used to implemented UE power saving, will be described.

A DRX-related UE procedure may be summarized as shown in Table 10.

TABLE 10

| | Signal type | UE procedure |
|---|---|---|
| Step 1 | RRC signaling (MAC-CellGroupConfig) | Reception of DRX configuration information |
| Step 2 | MAC CE ((Long) DRX command MAC CE) | Reception of DRX command |
| Step 3 | — | PDCCH monitoring during on-duration of DRX period |

Figure 15:
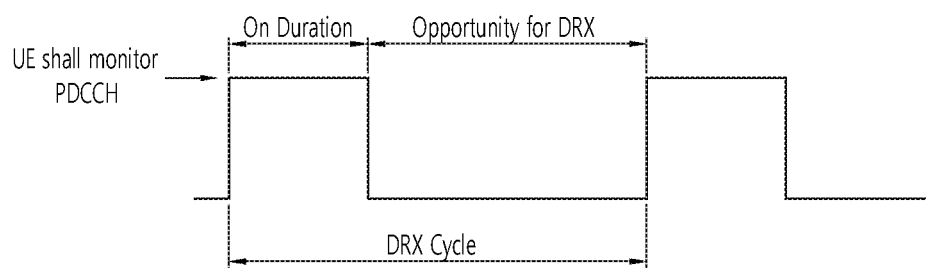
FIG. 15 illustrates a DRX period.

FIG. 15 illustrates a DRX period.

According to FIG. 15, the UE uses DRX in the RRC_IDLE and RRC_INACTIVE states to reduce power consumption. If DRX is set, the UE performs a DRX operation according to the DRX configuration information. The UE operating under the DRX scheme repeatedly turns on and off the reception operation.

For example, if DRX is set, the UE attempts reception of a downlink channel PDCCH only within a preconfigured time period but does not attempt reception of the PDCCH in the remaining time period. The time period during which the UE has to attempt PDCCH reception is defined as an on-duration period, where the on-duration period is defined once per DRX period.

The UE may receive DRX configuration information from the gNB through RRC signaling and may perform a DRX operation through reception of a (long) DRX command MAC CE.

The DRX configuration information may be included in the MAC-CellGroupConfig. The MAC-CellGroupConfig, an IE, may be used for configuration of MAC parameters with respect to a cell group, which includes DRX.

The DRX command MAC CE or long DRX command MAC CE may be identified by the MAC PDU sub-header having the LCID, which may have a fixed size.

The Table 11 below illustrates LCID values with respect to the DL-SCH.

TABLE 11

| Index | LCID values |
|---|---|
| 111011 | Long DRX Command |
| 111100 | DRX Command |

The PDCCH monitoring operation of the UE is controlled by DRX and bandwidth adaptation (BA). Meanwhile, if DRX is set, the UE doesn't have to continuously perform PDCCH monitoring. Meanwhile, DRX has the following characteristics:

On-duration: This is the period during which the UE waits to receive the next PDCCH after the UE wakes up. If the UE successfully decodes the PDCCH, the UE maintains the wake-up state and starts inactivity timer, Inactivity timer: This is the period during which the UE waits for successful PDCCH decoding since the last successful PDCCH decoding and also the period during which the UE sleeps again when the UE fails the PDCCH decoding. The UE has to restart the inactivity timer after single successful decoding of the PDCCH with respect to the single, first transmission (in other words, it is not intended for retransmission), Retransmission timer: This is the period during which retransmission is expected, and Period: Period specifies periodic repetition of the on-duration and succeeding, available inactivity periods.

In what follows, DRX within the MAC layer will be described. The MAC entity below may represent a UE or a MAC entity of the UE.

The MAC entity may be configured by RRC having a DRX function that controls the PDCCH monitoring activity of a UE with respect to C-RNTI, CS-RNTI, TPC-PUCCH-RNTI, TPC-PUSCH-RNTI, and TPC-SRS-RNTI of the MAC entity. When the DRX operation is employed, the MAC entity has to monitor the PDCCH. In the RRC_CONNECTED state, if DRX is set, the MAC entity may monitor the PDCCH discontinuously by using the DRX operation. Otherwise, the MAC entity has to monitor the PDCCH continuously.

RRC controls the DRX operation by configuring parameters of the DRX configuration information.

If the DRX period is set, activity time includes the following time periods.

Time period during which drx-onDurationTimer or drx-InactivityTimer or drx-RetransmissionTimerDL or drx-RetransmissionTimerUL or ra-ContentionResolution-Timer is in operation; or Time period during which a scheduling request is transmitted on the PUCCH and pending; or Time period during which a PDCCH that indicates new transmission to the C-RNTI of the MAC entity after a random access response with respect to a random access preamble not selected by the MAC entity among contention-based random access preambles has been successfully received.

If DRX is set, the UE may follow the procedure described below.

"1> If a MAC PDU is transmitted from a configured uplink grant,
   2> drx-HARQ-RTT-TimerUL with respect to the corresponding HARQ process is started immediately after the first reception of the corresponding PUSCH transmission;
   2> drx-RetransmissionTimerUL with respect to the corresponding HARQ procedure is stopped.
1> If drx-HARQ-RTT-TimerDL expires:
   2> If data of the corresponding HARQ procedure has not been successfully decoded:
      3> drx-RetransmissionTimerDL with respect to the corresponding HARQ procedure is started.
1> If drx-HARQ-RTT-TimerUL expires:
   2> drx-RetransmissionTimerUL with respect to the corresponding HARQ procedure is started.
1> If a DRX command MAC CE or (long) DRX command MAC CE is received:
   2> drx-onDurationTimer is stopped;
   2> drx-InactivityTimer is stopped.
1> If drx-InactivityTimer expires or DRX command MAC CE is received:
   2> If a short DRX period is set:
      3> drx-ShortCycleTimer is started or restarted;
      3> A short DRX period is used.
   2> Otherwise:
      3> A long DRX period is used.
1> If drx-ShortCycleTimer expires:
   2> A long DRX period is used.
1> If a long DRX command MAC CE is received:
   2> drx-ShortCycleTimer is stopped;
   2> A long DRX period is used.
1> If a short DRX period is used and [(SFN*10)+subframe number] modulo (drx-ShortCycle)=(drx-StartOffset) modulo (drx-ShortCycle); or
1> If a long DRX period is used and [(SFN*10)+subframe number] modulo (drx-LongCycle)=drx-StartOffset:
   2> If drx-SlotOffset is set:
      3> drx-onDurationTimer is started after drx-SlotOffset.
   2> Otherwise:
      3> drx-onDurationTimer is started.
1> If an MAC entity is within the activity time:
   2> PDCCH is monitored;
   2> If the PDCCH indicates DL transmission or DL allocation is configured:
      3> drx-HARQ-RTT-TimerDL with respect to the corresponding HARQ procedure is started immediately after transmission of the corresponding PUCCH.
      3> drx-RetransmissionTimerDL with respect to the corresponding HARQ procedure is stopped.
   2> If PDCCH indicates UL transmission:
      3> drx-HARQ-RTT-TimerUL with respect to the corresponding HARQ process is started immediately after the first reception of the corresponding PUSCH transmission;
      3> drx-RetransmissionTimerUL with respect to the corresponding HARQ procedure is stopped.
   2> If PDCCH indicates new transmission (UL or DL):
      3> drx-InactivityTimer is started or restarted.

1> Otherwise (in other words, if it is not part of the activity time):
2> type-0-triggered SRS is not transmitted.
1> If CQI masking (cqi-Mask) is configured by the upper layer:
2> If drx-onDurationTimer does not operate:
3> CSI report is not performed on the PUCCH.
1> Otherwise:
2> If the MAC entity is not within the activity time:
3> CSI report is not performed on the PUCCH".

Irrespective of whether the MAC entity monitors the PDCCH or not, the MAC entity may transmit HARQ feedback and type-1-triggered SRS if the MAC entity is expected.

If the activity time is not a complete PDCCH occasion (namely, a case where activity time starts in the middle of the PUCCH occasion or expires), In what follows, DRX for paging will be described.

The UE may use DRX in the RRC_IDLE and RRC_INACTIVE states to reduce power consumption. The UE may monitor one paging occasion (PO) for each DRX cycle, where one PO may comprise a plurality of time slots (for example, subframes or OFDM symbols) to which paging DCI may be transmitted. In a multi-beam operation, the UE may assume that the length of one PO corresponds to one period of beam sweeping, and the same paging message is repeated within all of the beams having a sweeping pattern. The paging message for paging initiated by the RAN is the same as that initiated by the CN.

One paging frame (PF) is one radio frame and may include one or a plurality of POs.

When receiving RAN paging, the UE initiates an RRC connection resume procedure. If the UE receives paging initiated by the CN while being in the RRC_INACTIVE state, the UE may transition to the RRC_IDLE state and inform of the transition.

Meanwhile, a new RAT system such as NR may use the OFDM transmission scheme or a similar transmission scheme. The new RAT system may follow OFDM parameters different from the OFDM parameters of the LTE. Or the new RAT system may adopt the numerology of the conventional LTE/LTE-A system but may employ larger system bandwidth (for example, 100 MHz). Or in the new RAT system, one cell may support a plurality of numerologies. In other words, UEs operating under different numerologies may coexist in one cell.

In the NR system, OFDM(A) numerology (for example, SCS, CP length, and so on) may be configured differently among a plurality of cells aggregated into one UE. Accordingly, the (absolute time) period of a time resource (for example, subframe, slot, or TTI) (for the sake of convenience, it is called a Time Unit (TU)) composed of the same number of symbols may be configured differently among aggregated cells.

Figure 16:
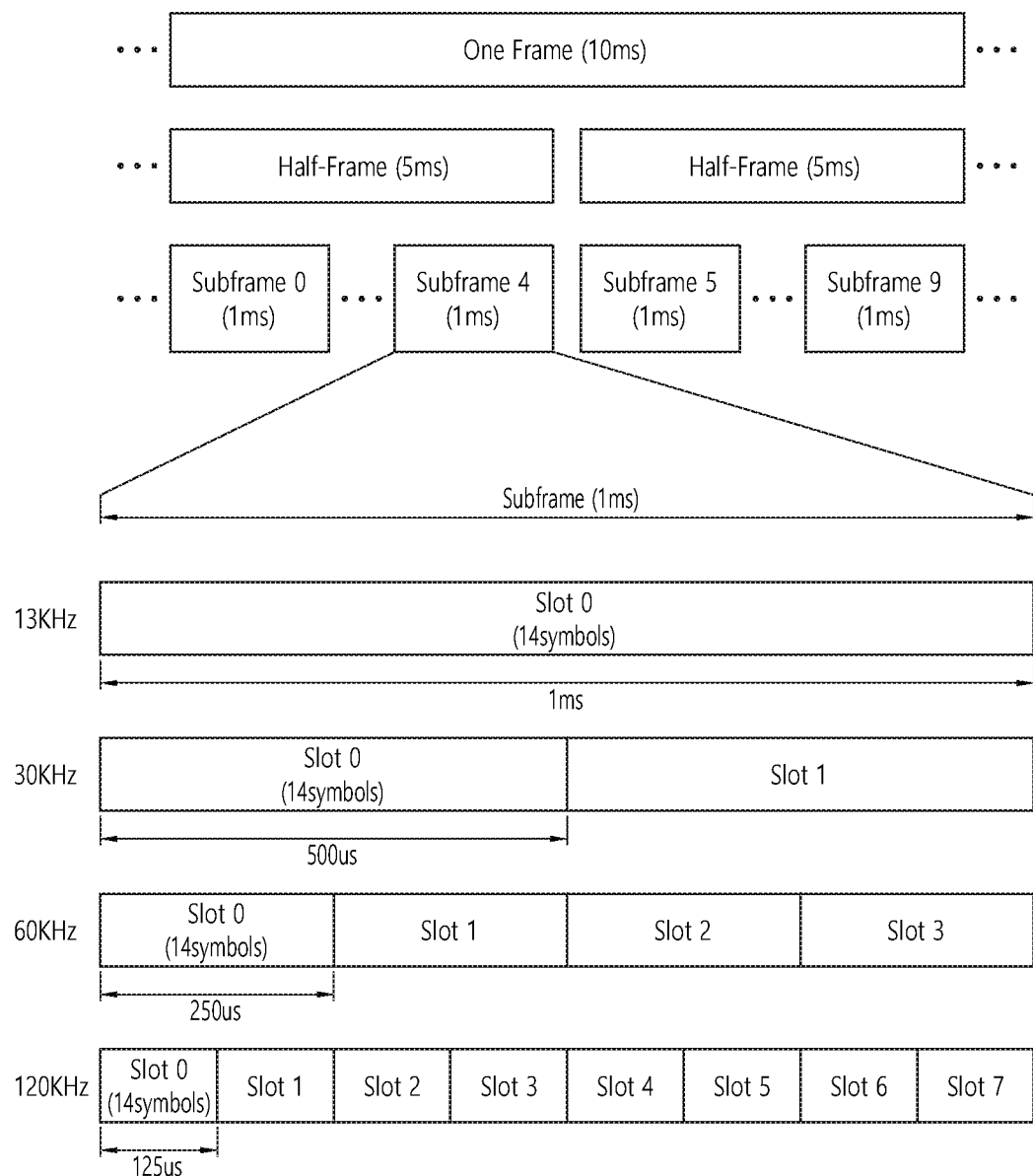
FIG. 16 illustrates a structure of a radio frame that may be used in the next-generation communication.

FIG. 16 illustrates a structure of a radio frame that may be used in the next-generation communication.

A radio frame has a length of 10 ms and may be defined by two half frames (HFs) of 5 ms. A half frame may include five subframes (SFs) of 1 ms. A subframe may be divided into one or more slots, and the number of slots within a subframe may be determined by subcarrier spacing (SCS). Each slot may include 12 or 14 OFDM(A) symbols according to the Cyclic Prefix (CP) employed.

When the normal CP is used, each slot may include 14 symbols. When the extended CP is used, each slot may include 12 symbols. Here, a symbol may include OFDM symbols (or CP-OFDM symbols) and SC-FDMA symbols (or DFT-s-OFDM symbols).

Figure 17:
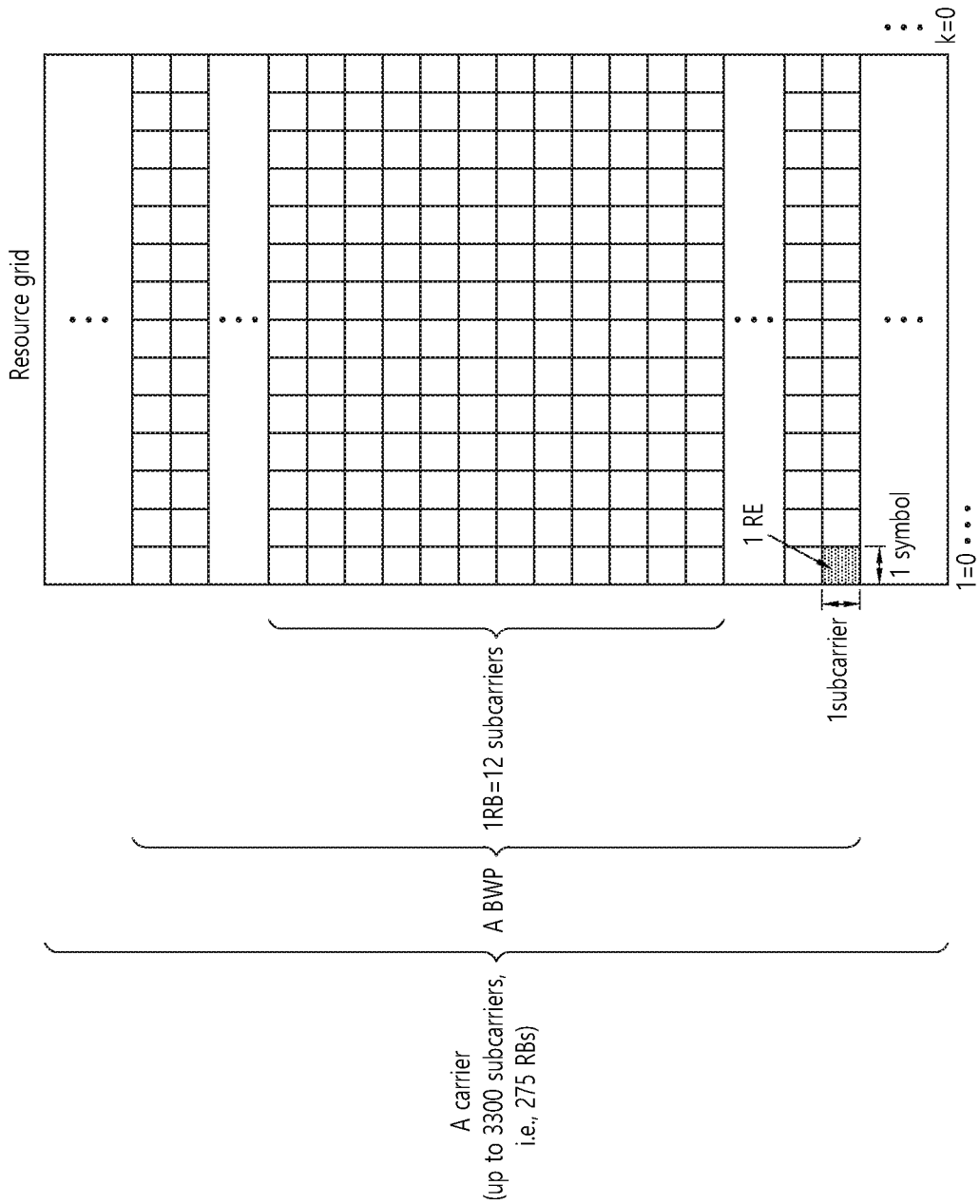
FIG. 17 illustrates a slot structure of a frame used in the next-generation communication.

FIG. 17 illustrates a slot structure of a frame used in the next-generation communication.

A slot includes a plurality of symbols in the time domain. For example, in the case of normal CP, one slot includes 14 symbols; in the case of extended CP, one slot may include 12 symbols. Or in the case of normal CP, one slot may include 7 symbols; in the case of extended CP, one slot may include 6 symbols. Configuration of a slot may be set differently according to the standard specification.

A carrier component includes a plurality of subcarriers in the frequency domain. A resource block (RB) may be defined by a plurality of contiguous subcarriers in the frequency domain. Bandwidth part (BWP) may be defined by a plurality of contiguous (P)RBs in the frequency domain and may correspond to one numerology (for example, SCS and CP length). A carrier component may include up to N (for example, 5) BWPs. Data communication is performed through an activated BWP, and one BWP may be activated for one UE. In the resource grid, each element is referred to as a resource element (RE), and one complex symbol may be mapped to each individual element.

Figure 18:
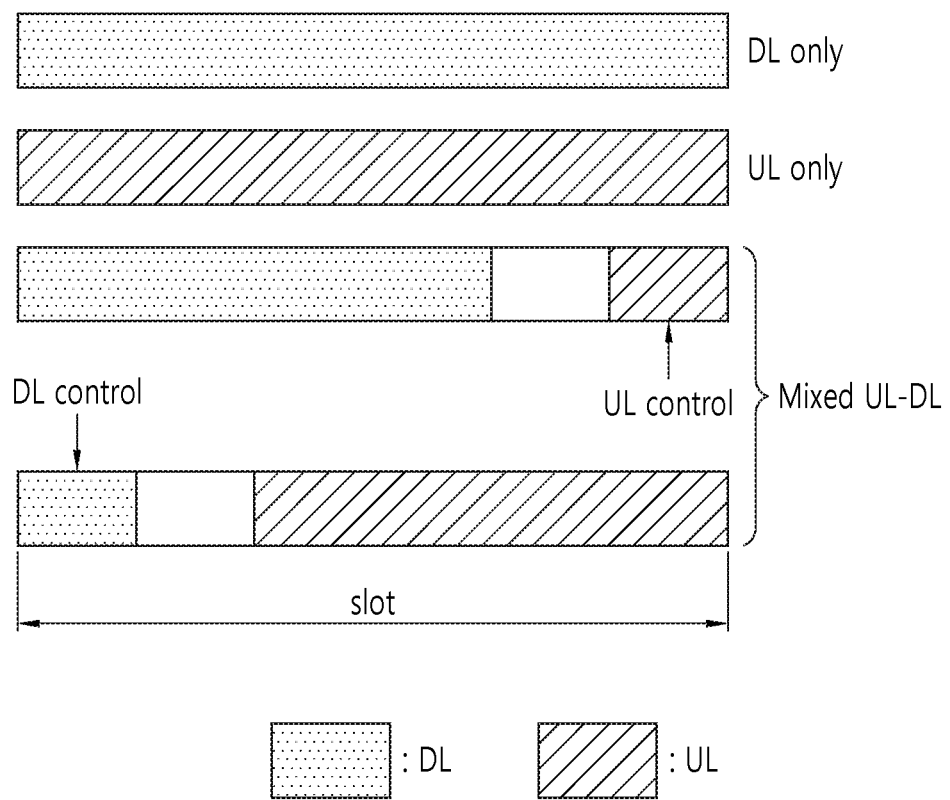
FIG. 18 illustrates a structure of self-contained slot.

FIG. 18 illustrates a structure of self-contained slot.

Referring to FIG. 18, a self-contained structure may be supported, in which one slot includes all of a DL control channel, DL or UL data channel, UL control channel, and so on. For example, the first N symbols in a slot may be used for transmitting a DL control channel (in what follows, DL control region), and the last M symbols in the slot may be used for transmitting an UL control channel (in what follows, UL control region). N and M are each an integer of 0 or larger. A resource region located between the DL and UL control regions (in what follows, a data region) may be used for transmission of DL data or UL data.

As one example, one slot may correspond to one of the following configurations. Each period is listed in the time order.
1. DL only configuration
2. UL only configuration
3. Mixed UL-DL configuration
   DL region+Guard Period (GP)+UL control region
   DL control region+GP+UL region Here, a DL region may correspond to (i) a DL data region or (ii) DL control region plus DL data region while a UL region may correspond to (i) an UL data region or (ii) UL data region plus UL control region.

In the DL control region, a PDCCH may be transmitted, and in the DL data region, a PDSCH may be transmitted. In the UL control region, a PUCCH may be transmitted, and in the UL data region, a PUSCH may be transmitted. In the PDCCH, Downlink Control Information (DCI), for example, DL data scheduling information or UL data scheduling data may be transmitted. In the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A GP provides a time gap during a process where a gNB and a UE transition from the transmission mode to the reception mode or a process where the gNB and UE transition from the reception mode to the transmission mode. Part of symbols belonging to the occasion in which the mode is changed from DL to UL within a subframe may be configured as the GP.

In what follows, a method for determining (configuring) a resource direction in the Integrated Access and Backhaul (IAB) system will be proposed.

First, abbreviations are defined.

IAB: Integrated Access and Backhaul
CSI-RS: Channel State Information Reference Signal
SF: Slot Format related Information
CORESET: Control resource set
IAB: Integrated Access & Backhaul
DgNB: Donor gNB
RN: Relay node
D: downlink
U: uplink
F (or X): flexible
AC: Access
BH: Backhaul
DU: Distributed Unit
MT: Mobile terminal
CU: Centralized Unit In what follows, an IAB-node refers to a node capable of supporting wireless access of a UE and transferring access traffic to another node (for example, a gNB, relay, or other UE).

IAB-donor refers to a node that provides a UE with an interface to the core network and provides an IAB-node with a wireless backhaul function.

Technologies mentioned below may be used for various wireless access systems such as CDMA, FDMA, TDMA, OFDMA, and SC-FDMA. CDMA may be implemented by a radio technology such as Universal Terrestrial Radio Access (UTRA) or CDMA2000. TDMA may be implemented by a radio technology such as Global System for Mobile communications (GSM)/General Packet Radio Service (GPRS)/Enhanced Data Rates for GSM Evolution (EDGE). OFDMA may be implemented by a radio technology such as the IEEE 802.11 (Wi-Fi), IEEE 802.16 (WiMAX), IEEE 802-20, and E-UTRA (Evolved UTRA). UTRA is part of Universal Mobile Telecommunications System (UMTS). 3rd Generation Partnership Project (3GPP) Long Term Evolution (LTE) is part of Evolved UMTS (E-UMTS) that uses E-UTRA, and LTE-Advanced (LTE-A)/LTE-A pro is an evolved version of the 3GPP LTE. 3GPP New Radio or New Radio Access Technology (NR) is an evolved version of the 3GPP LTE/LTE-A/LTE-A pro.

To clarify descriptions, the present disclosure is described based on the 3GPP communication system (for example, LTE-A, NR), but the technical principles of the present disclosure are not limited to the specific system. LTE refers to the technology after the 3GPP TS 36.xxx Release 8. More specifically, the LTE technology after the 3GPP TS 36.xxx Release 10 is referred to as the LTE-A, and the LTE technology after the 3GPP TS 36.xxx Release 13 is referred to as the LTE-A pro. The 3GPP NR refers to the technology after the TS 38.xxx Release 15. LTE/NR may be referred to as the 3GPP system. "xxx" denotes a specific number of the standard document. LTE/NR may be collectively called the 3GPP system. The background technology, terminologies, and acronyms used in the description of the present disclosure may reference those specified in the standard documents published prior to the present disclosure.

In what follows, integrated access and backhaul (IAB) will be described.

One of potential technologies that enable cellular network disposition scenarios and applications in the future disposes NR cells flexibly and densely without causing congestion of transfer networks by supporting wireless backhaul and relay links.

NR may use/dispose a massive MIMO or multi-beam system by default, and the bandwidth expected to be used in the NR is larger than that for the LTE. Therefore, an integrated access and backhaul (IAB) link is needed, through which a plurality of control and data channels/procedures defined for providing access to UEs may be constructed.

In the IAB environment, to prevent interference among a plurality of nodes and UEs, collision in the resource direction has to be minimized. For example, suppose a resource allocated by a first UE to transmit an uplink signal to a first node at the same occasion and in the same frequency band is a resource for uplink (U) and a resource allocated by a second UE to receive a downlink signal from a second node is a resource for downlink (D). In this case, an uplink signal that the first UE transmits by using the allocated resource may act as interference on the resource allocated to the second UE.

There may be various factors causing interference in the IAB environment; however, if the resource direction may be at least defined to minimize interference between nodes/UEs, stability and performance of an IAB system will be further ensured.

Figure 19:
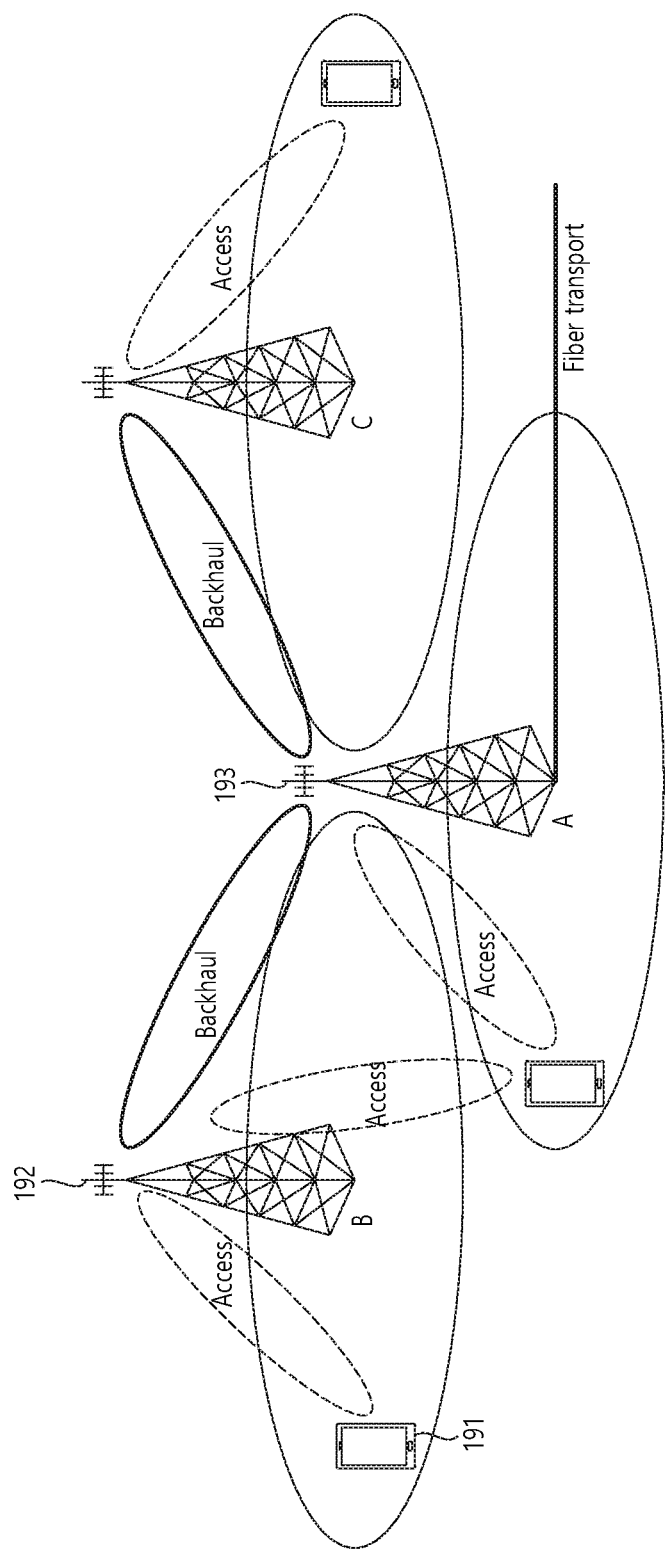
FIG. 19 illustrates one example of a network including integrated access and backhaul (IAB) links.

FIG. 19 illustrates one example of a network including integrated access and backhaul (IAB) links.

A wireless link between a UE 191 and a relay node or gNB node 192 may be referred to as an access link while a wireless link between the relay node or the gNB node 192 and other relay node or other gNB node 193 may be referred to as a backhaul link. At least one gNB node or relay node may be connected to the core network in a wired manner.

An access and backhaul links may use the same frequency band or different frequency bands.

Meanwhile, operating an NR system in the millimeter wave spectrum may cause severe blocking (short-term blocking effect) that may not be reduced by the current RRC-based handover mechanism. To overcome the blocking effect, a RAN-based mechanism may be needed so that fast switching occurs among relay nodes (or gNB nodes hereinafter the same).

To this purpose, it is necessary to develop an integrated framework that enables fast switching of access and backhaul links. Over-the-Air (OTA) coordination among relay nodes may be regarded as relieving interference and supporting end-to-end path selection and optimization.

IAB for NR has to consider the following requirements and aspects.

1) Efficient and flexible operation for in-band and out-of-band relay in indoor and outdoor scenarios, 2) multi-hop and redundant connections, 3) end-to-end path selection and optimization, 4) support of backhaul links with a high spectrum efficiency, and 5) support for legacy NR UEs.

Figure 20:
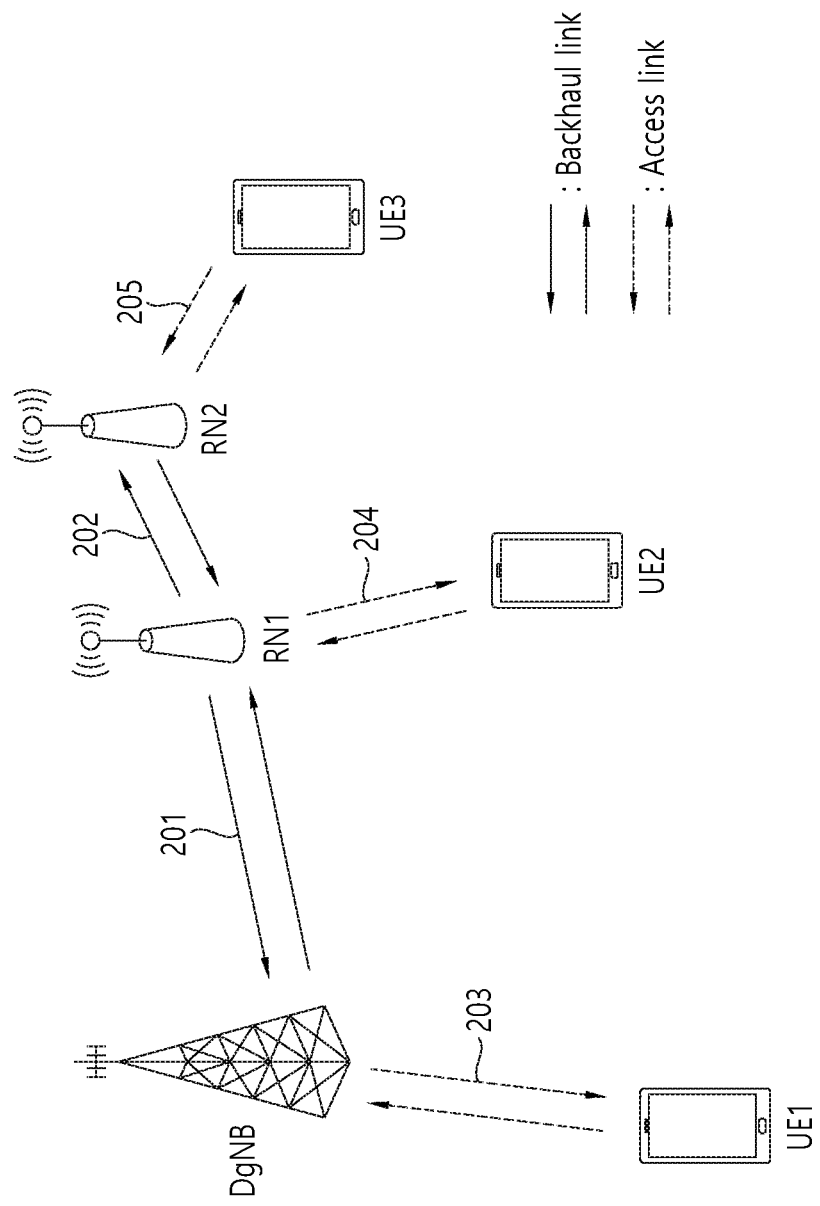
FIG. 20 illustrates a system including a gNB, relay node, and UE in an IAB environment.

FIG. 20 illustrates a system including a DgNB, relay node, and UE in an IAB environment.

Referring to FIG. 20, in the IAB scenario, the half-duplex scheme may be supported. Also, in the IAB scenario, the full-duplex scheme may be supported.

If each relay node (RN) does not have scheduling capability, the DgNB has to schedule the entire links among the DgNB, associated relay nodes, and UEs. That is, after collecting traffic information from all of the associated relay nodes and making a scheduling plan for all of the links, the DgNB may inform each relay node of the scheduling information.

For example, a backhaul and access links may be constructed as shown in FIG. 20. In this case, the DgNB may not only receive a scheduling request of the UE 1 but also receive the scheduling requests of UE 2 and UE 3. Afterwards, the DgNB may determine scheduling of two backhaul links 201, 202 and three access links 203, 204, 205 and inform of the scheduling result. This type of centralized scheduling may include delayed scheduling and latency issues.

On the other hand, distributed scheduling may be implemented if each relay node has scheduling capability. Then scheduling may be performed promptly upon an uplink scheduling request from a UE, and a backhaul/access link may be utilized more flexibly according to the surrounding traffic conditions.

<Backhaul Link Discovery and Measurement>

IAB Node Initial Access

An IAB node may follow the same initial access procedure including cell search, acquisition of system information, and random access, as done by a UE to establish a connection to a parent IAB node or IAB donor at the initial step. SSB/CSI-RS based RRM measurement may be the starting point for IAB node discovery and measurement.

To prevent configuring a colliding SSB among IAB nodes and implement CSI-RS based IAB node discovery, a discovery procedure for IAB nodes may be considered according to a half-duplex restriction condition and multi-hop topologies. When cell ID used for a given IAB node is considered, the following two cases may be taken into account.

Case 1: The case where an IAB donor and IAB node share the same cell ID.

Case 2: The case where an IAB donor and IAB node maintain separate cell IDs.

Also, a mechanism for multiplexing RACH transmission from a UE and RACH transmission from an IAB node has to be considered.

<Backhaul Link Measurement>

Multi-backhaul links have to be measured for link management and path selection. From the viewpoint of a given IAB node, to support the half-duplex restriction condition, IAB may support for search and measurement of candidate backhaul links (after the initial access) that use resources used by an access UE for cell search and measurement and resources orthogonal to each other in the time domain. Related to the above, the following factors may be further considered.

1) TDM of SSB (which differs according to a hop order or cell ID, for example), 2) SSB muting among IAB nodes, 30 multiplexing of an access UE and SSBs for IAB for a half frame or over half frames, 4) IAB node discovery signal (for example, CSI-RS) TDMed with the Rel-15 SSB transmission, and 6) transmission period for backhaul link detection and measurement, different from the period used by the access UE.

A mechanism for transmission of a reference signal to IAB nodes and coordination of measurement occasions has to be considered. SMTC and CSI-RS structure for supporting RRM measurement of IAB nodes may have to be improved.

<Backhaul Link Management>

An IAB node may support a mechanism for detecting/recovering a backhaul link failure based on the Rel-15 mechanism. Improvement of the RLM RS and IAB-related procedure may be further considered.

<Path Switching or Transmission/Reception Mechanism for Multi-Backhaul Links>

A mechanism (for example, multi-TRP operation and dual connectivity within the frequency) for efficient path switching or transmission and reception may have to be considered simultaneously for multi-backhaul paths.

<Scheduling and Resource Allocation/Coordination>

1. Backhaul and Access Link Scheduling

Downlink IAB node transmission (in other words, backhaul link transmission from an IAB node to a child IAB node and access link transmission from the IAB node to UEs) may be scheduled by the IAB node itself. Uplink IAB transmission (in other words, transmission from an IAB node to a parent IAB node or transmission to an IAB donor) may be scheduled by the parent IAB node or IAB donor.

2. Multiplexing of Access and Backhaul Link

IAB may support TDM, FDM and/or SDM between an access link and backhaul link from the IAB node and may apply the half duplex restriction condition.

An efficient TDM/FDM/SDM multiplexing mechanism of access/backhaul traffic through multi-hop with respect to the half-duplex restriction of an IAB node may have to be considered.

The following factors may be considered for various multiplexing options.

1) A mechanism for orthogonally dividing time slots or frequency resources between access and backhaul link at one or multiple hops, 2) utilization of different DL/UL slot structure for the access and backhaul link, 3) DL and UL power control improvement and timing condition that allow FDM and SDM within the panel of the backhaul and access link, and 4) interference management including mutual interference.

3. Resource Coordination

A mechanism for scheduling coordination across an IAB node/IAB donor and multi-backhaul hops, resource allocation, and route selection may have to be considered. For resources (frequency and time in view of slot/slot format) among IAB nodes, a semi-static configuration method may be supported (at the time scale of the RRC signal). The following aspects may be further considered.

1) Distributed or central coordination mechanism, 2) granularity of signaling resources required (for example, TDD configuration pattern), 3) exchange of L1 and/or L3 measurement values among IAB nodes, 4) exchange (for example, hop order) of topology-related information that affects research on design of the physical layer of the backhaul link, 5) coordination of resources (time and frequency resource in view of slot/slot format) faster than semi-static coordination.

4. IAB Node Synchronization and Timing Alignment

The effect of feasibility of over-the-air (OTA) synchronization and timing misalignment exerted on the IAB performance (for example, the number of hops that may be supported) may have to be considered. A mechanism for timing alignment in the multi-hop NR-IAB network may have to be considered. IAB may support synchronization based on timing advanced (TA) among IAB nodes including multi-backhaul hops. Improvement of the conventional timing alignment mechanism may also be considered.

The following examples for transmission timing alignment among IAB nodes and IAB donors may be considered:

1) Case 1: DL transmission timing alignment across IAB nodes and IAB donors,

2) Case 2: Alignment of DL and UL transmission timing within an IAB node,

3) Case 3: Alignment of DL and UL reception timing within an IAB node,

4) Case 4: The case where transmission is performed according to the Case 2 within the IAB node, and reception is performed according to the Case 3, and 5) Case 5: The case where the Case 1 is applied for access link timing, and the Case 4 is applied for backhaul link timing in a different time slot within the IAB node.

IAB nodes/IAB donors or IAB node may consider alignment at the following levels:

1) Slot level alignment, 2) symbol level alignment, and 3) no alignment.

5. Cross link interference (CLI) measurement and management

The effect of cross link interference (CLI) exerted on the access and backhaul link (including multi-hops) may be considered.

1) CLI Mitigation Technique

A CLI mitigation technique including advanced coordination of a receiver and transmitter may be considered. At this time, priority may have to be determined from the complexity and performance aspects. The CLI mitigation technique needs to be able to manage inter-IAB interference scenarios as follows: i) Case 1: The case where a victim IAB node is in the middle of reception through an MT from the DL, and an interference IAB node is in the middle of transmission through the MT using the UL, ii) Case 2: The case where a victim IAB node is in the middle of reception through its own MT from the DL, and an interference IAB node is in the middle of transmission through a DU using the DL, iii) Case 3: the case where a victim IAB node is in the middle of reception through a DU from the UL, and an interference IAB node is in the middle of transmission through the MT using the UL, and iv) Case 4: The case where a victim IAB node is in the middle of reception through a DU from the UL, and an interference IAB node is in the middle of transmission through the DU using the DL.

When FDM/SDM reception is performed between an access and backhaul links in a given IAB node, the interference experienced at the IAB node may be considered.

2) CLI Measurement Technique

If CLI is to be mitigated in the IAB environment, CLI measurement such as short-term and long-term measurement; and multi-antenna and beamforming has to be considered.

For a backhaul link, 1024 QAM may be supported.

In what follows, based on the descriptions given above, the present disclosure will be described in more detail.

In the present disclosure, access may be a gNB-UE, and backhaul may be a gNB-gNB or gNB-core network. In NR, access and backhaul may use different radio resources/radio channels but may also use the same radio resources and/or radio channels. For example, a radio resource and radio channel used for a first gNB to serve UEs connected through an access link may also be used for a backhaul link between the first gNB and a second gNB.

In the descriptions above, terms such as a gNB and UE are used for the purpose of convenience and may be replaced with another term such as a node. For example, suppose the second eNB controls/schedules a UE connected to the first gNB through an access link via a backhaul link to the first gNB (a link connecting the second gNB via the first gNB to a UE). In this case, the second gNB may be referred to as a parent node or donor node from the viewpoint of the first gNB while the UE may be referred to as a child node. And the first gNB may also be referred to as a relay node or IAB node. Also, from the viewpoint of the second gNB, the first gNB may be called a child node.

Figure 21:
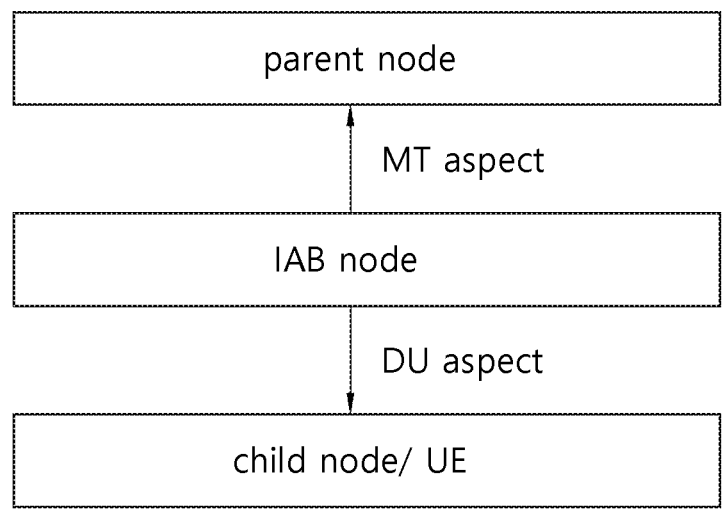
FIG. 21 illustrates nodes in the IAB environment.

FIG. 21 illustrates nodes in the IAB environment.

Referring to FIG. 21, an IAB node may be regarded as being similar to a UE in the relationship to a parent node, and in view of the IAB node, the IAB node may be regarded as a mobile terminal (MT) in relation to the parent node.

Also, the IAB node may be regarded as being similar to a distributed unit (DU) such as a gNB or a relay in the relationship to a child node, and in view of the IAB node, the IAB node may be regarded as a distributed unit (DU) in relation to the child node.

Meanwhile, in the IAB environment, symbol direction may be defined commonly or separately for each node or UE. Part of the nodes may be relay nodes.

1. Operation Direction Indication

Instead of informing of the symbol format in terms of a link direction such as D, U, or X, the symbol format may be defined to provide a 'direction of operation' of a node or UE receiving the format (for example, transmission or reception).

In other words, the symbol format may be given at least by one of transmission (Tx or denoted by T), reception (Rx or denoted by R), and none (denoted by N), where the corresponding formats may be interpreted as follows.

i) Transmission (Tx or T): It indicates a period in which a node or UE transmits a signal irrespective of a link.

ii) Reception (Rx or R): It indicates a period in which a node or UE receives a signal irrespective of a link.

iii) None (N): It indicates a period in which a node or UE performs no operation.

2. Formats for Access Link and Backhaul Link

In the IAB environment, a new symbol format may be needed to clearly distinguish resources of an access and backhaul links. For example, if symbol formats are denoted by A and B, they may be interpreted as follows:

i) A: symbol that may be used only for an access link, and
ii) B: symbol that may be used only for a backhaul link.

When the slot format is informed to a node or UE, not only D, X, and U but also the A and B may be additionally informed or used.

3. Entry for Access Link and/or Backhaul Link

Instead of defining a separate format, the entry itself of a slot format defined in the standard specification may be defined as an entry that may indicate a resource for an access link or backhaul link.

For example, Table 3 above illustrates formats having an index ranging from 0 to 255, where the formats with an index from 56 to 255 are in the 'reserved' state. In Table 3, each slot format may be termed as an entry. If the entry 253 of the standard specification (for example, Table 3) is informed to a node/UE as one of slot formats, the node/UE may recognize the entry as a slot format indicating availability only for a backhaul link. Similarly, if the entry 254 of the standard specification (for example, Table 3) is informed as one of slot formats, the node/UE may recognize the entry as a slot format indicating availability only for an access link. It should be noted that the entry number may have a different number from the example above. The main point of the present disclosure is that an entry indicating a resource (for example, slot) for a dedicated use of a backhaul and access links may be specified in the standard specification.

4. Search Space for Access Link and/or Backhaul Link

Information about a slot format (slot format information) may be relayed from an upper node (which may be called a parent node or simply a parent) to a lower node (which may be called a child node or simply a child). Or the slot format information may be relayed from each to UEs connected to the corresponding node. A search space to which the slot format information is transmitted may be configured; the following options may be considered as a method for configuring the search space:

i) Option 1: Individual search spaces for a control channel that relay the slot format information in an access and backhaul links may be disposed so that they are not overlapped with each other. This way of disposition may also include a case where resources of the CORESET of each link are not overlapped with each other;

ii) Option 2: The monitoring periods of individual search spaces for a control channel that relay the slot format information in an access and backhaul links may be (unconditionally) set to be different from each other;

Option 2-1: When the monitoring period of each search space overlaps and resources thereof also overlap, it may be assumed that only the search space for a backhaul link is monitored; and Option 2-2: When the monitoring period of each search space overlaps and resources thereof also overlap, it may be assumed that only the search space for a backhaul link is monitored.

5. Format Structure

The format structure of normal resources (for example, symbols in a slot) may have D-X-U in time order. The format structure indicates a resource direction of symbol sets in one slot, and D-X-U indicates a structure where a symbol set D (which may include one or more symbols. Hereinafter the same) is first disposed within the slot, then a symbol set X, and then a symbol set U is finally disposed. Since a time period for preparing for uplink transmission and a guard period (GP) are needed for a UE to transmit an upper link, a flexible resource is inevitably required between D and U.

Meanwhile, in the IAB environment, even if the resource direction of a particular child node (IAB node) is 'reception', the resource direction may be a downlink from a parent node while it may be an upper link from a UE.

Figure 22:
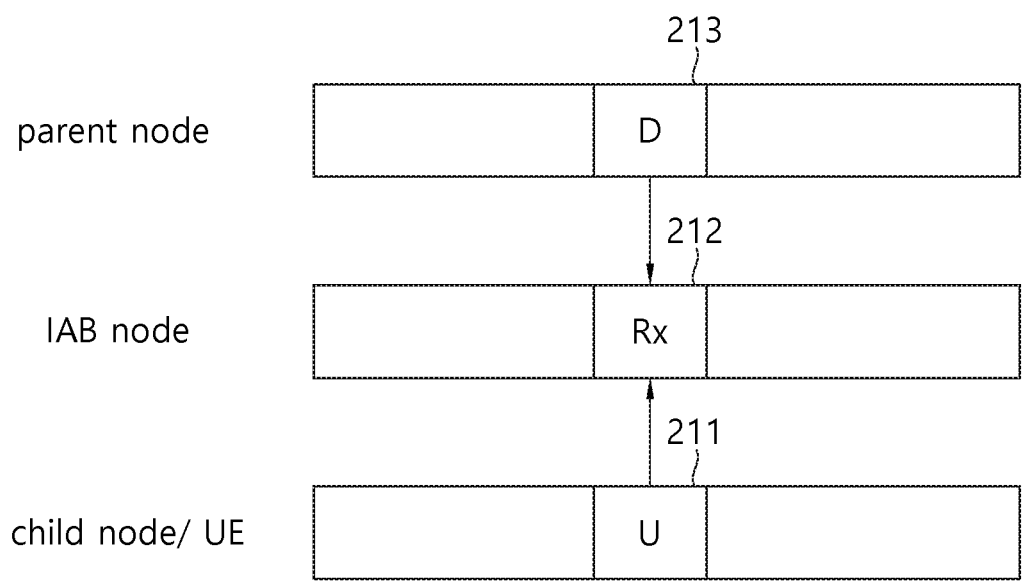
FIG. 22 illustrates a resource direction of an IAB node and resource directions of a parent node and a UE in the IAB environment.

FIG. 22 illustrates a resource direction of an IAB node and resource directions of a parent node and a UE in the IAB environment.

Referring to FIG. 22, in the resource 212 where the resource direction of an IAB node is configured as 'Rx', the corresponding resource 213 of a parent node of the IAB node may be configured as downlink (D), and the corresponding resource 211 of a UE connected to the IAB node may be configured as an uplink (U).

As described above, a resource supposed to operate for reception in view of one node may have a different resource direction (link direction or resource direction, hereinafter the same) from a viewpoint of other related node/UE. If the aforementioned operation direction (for example, Rx) is informed to a specific node with respect to a specific resource, the specific node may recognize the operation direction of the specific resource, but both of the uplink and downlink may be defined within the specific resource.

Figure 23:
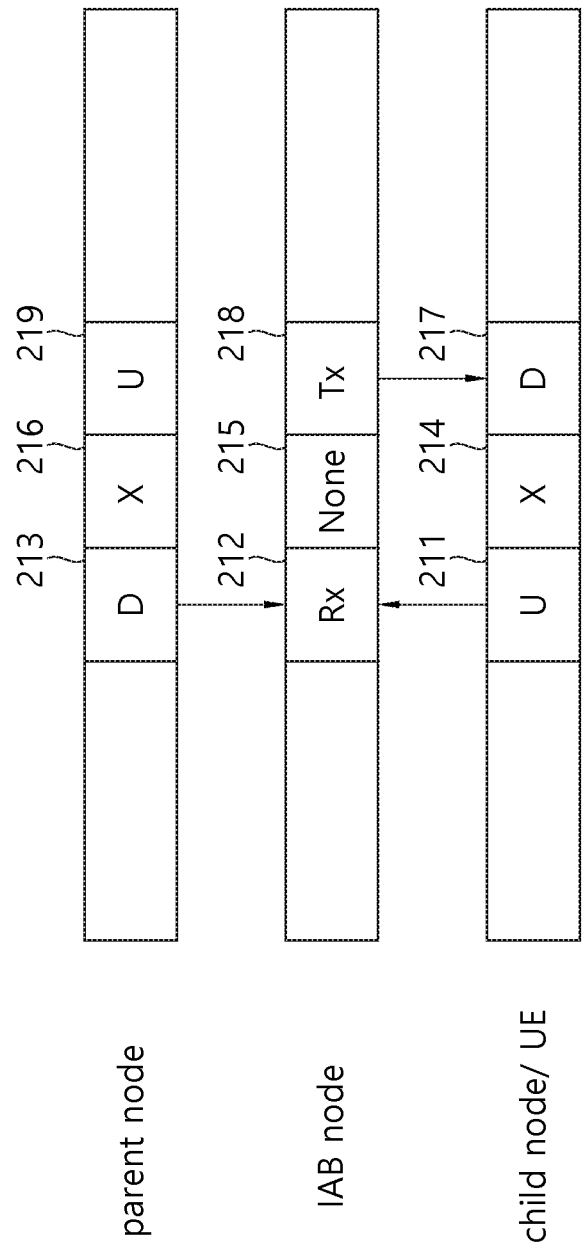
FIG. 23 is another example illustrating a resource direction of an IAB node and resource directions of a parent node and a UE in the IAB environment.

FIG. 23 is another example illustrating a resource direction of an IAB node and resource directions of a parent node and a UE in the IAB environment.

Referring to FIG. 23, suppose an IAB node has been configured with an operation direction of 'Rx-None-Tx' for the resources 212, 215, 218. At this time, the Rx resource 212 may receive downlink transmission from a parent node or uplink transmission from a child node/UE. In other words, the resource 212 configured as an Rx resource from the viewpoint of the IAB node may be configured as a downlink resource 213 from the viewpoint of a parent node while it may be configured as an uplink resource 211 from the viewpoint of a child node/UE. The IAB node may inform the child node or UE of the resource direction, where a format structure in the form of 'U-X-D' may be informed to the resources 211, 214, 217. As pointed out, it is necessary to make a format structure in the form of 'U-X-D', and the following options may be considered as an additional format structure (namely, as a format structure for one slot).

i) Option 1: The format structure starts with X, ii) Option 2: The format structure is so formed that X lies between U and D in the form of 'U-D', iii) Option 3: The format structure is so formed that X precedes D, iv) Option 4: The format structure is so formed that X follows U, v) Option 5: The format structure is so formed that X is located before and after the slot format shown in Table 3.

By reflecting at least one of the options, various format structures may be considered as shown in the table below.

TABLE 12

| | |
|---|---|
| U-X-D | X-D-X-U-X-D |
| U-D | X-U-D |
| U-D-X | X-U-D-X |
| D-X-U-D | X-U-X-D |
| D-X-U-D-X | X-U-X-D-X |
| D-X-U-X | U-X-D-X |
| D-X-U-X-D | U-D-X |
| D-X-U-X-U | |
| X-D-X-U | |
| X-D-X-U-D | |
| X-D-X-U-D-X | |
| X-D-X-U-D-X-U | |
| X-D-X-U-D-X-U-X | |
| X-D-X-U-X-D | |
| X-D-X-U-X-D-X | |

6. Slot Format Indication Method

For example, when dynamic slot format related information (dynamic SFI) is provided, a slot format combination may be informed based on predetermined (for example, defined in the standard specification) slot formats.

In addition to the method above, a slot in the resource direction and the number of symbols may also be informed by using a method for providing dynamic slot format indicator or slot format information (SFI).

In other words, a slot corresponding to D (downlink) and the number of symbols; a slot corresponding to X and the number of symbols; and a slot corresponding to U (uplink) and the number of symbols may be informed. Also, since each direction has priority of order, an order of parameters for each direction may also be defined together.

7. Slot Format Application Timing

If the index of a slot to which information related to the slot format is transmitted from a gNB is denoted by n, a slot format transmission and reception slot of each node and UE may be denoted by slot n+k. In other words, if slot format-related information is received from the slot n, a node or UE may apply the slot format determined based on the information from the slot n+k or n+k+1. Similarly, the slot format may be applied from the slot n+k+a, where a may be determined according to the standard specification or configured by RRC/upper layer signaling.

If a gNB defines and transmits slot formats for all of the child nodes and UEs, since it may take time until information informing of the corresponding slot format is transmitted to reach each node and UE, the procedure above may be needed.

8. Soft Type Time Resource

Directions of a time resource usually include downlink (D), flexible (F), and uplink (U). In the IAB environment, a donor node may perform resource allocation for all of its child nodes (namely, all of the IAB nodes connected to the donor).

One of the resource allocation methods is that the donor node determines all of semi-static D/U of individual IAB nodes and informs the determined directions to the respective IAB nodes. At this time, since it is not easy to predict future data load on each IAB node from the viewpoint of the donor node, the donor node may allocate resources conditionally available for each IAB node while informing of D/F/U. This type of resources may be defined as 'soft' resources. 'Hard' resources may also be defined as a corresponding concept of the soft resources. Hard resources may have hard D/F/U while soft resources may have soft D/F/U. A hard and soft resources may be defined as follows:

i) Hard D/F/U: A resource that may be used without any restriction as a D/F/U resource when each IAB node operates as a DU, and ii) Soft D/F/U: A resource that may be activated by a parent node of an IAB node. If activated, this resource may be used in the same way as a hard resource when the IAB node operates as a DU.

More specific definitions for the hard and soft resources will be described in the corresponding part of the document below.

A soft resource may be allocated by a donor node together with a hard resource.

1) Location of Source Resource

A donor node may dispose a soft resource arbitrarily if no particular rule is applied for disposition of the soft resource. However, since availability of a soft resource is determined according to a current data load and data load in a near future, waste of resource may be reduced from the viewpoint of the IAB node by placing the soft resource at a location appropriate for use. A donor node may dispose a soft resource according to the following rule.

i) Soft D:

Option 1: A soft resource may be disposed between hard D and hard F. Or, Option 2: a soft resource may be disposed between hard D and soft F.

ii) Soft F: Option 1: A soft resource may be disposed between soft D and soft U. Or, Option 2: a soft resource may be disposed within hard F (for example, to be overlapped with hard F).

iii) Soft U: Option 1: A soft resource may be disposed between hard F and hard U. Or, Option 2: a soft resource may be disposed between soft F and hard U.

2) Resource Type Indication

A method for indicating a soft resource to an IAB node may include an indication method through an RRC parameter and a method using a slot format defined in the standard specification.

i) Method for Using RRC Parameter

Semi-static D/U assignment informed to a UE by a gNB includes a cell-specific, semi-static D/U assignment and/or UE-specific, semi-static D/U assignment.

A method for informing of D/U assignment in a cell-specific manner informs of a semi-static period, the number (x1) of D slots starting from the start of the period, the number (x2) of D symbols in the next slot, the number (y1) of U slots starting in a reverse order from the end of the period, and the number (y2) of U symbols in the next slot.

A method for informing of D/U assignment in a UE-specific manner designates a particular slot within a semi-static period and informs of the number of D symbols or U symbols starting from the start of the slot. Since the method for informing of D/U assignment in a UE-specific manner may defines a resource direction for one slot, a plurality of UE-specific indications may be defined to inform of resource directions to a plurality of slots in a UE-specific manner.

By using the method above, a method for defining a soft resource may be considered.

The first option (Opt1) applies the cell-specific method, assumes an order of 'hard D-soft D-F-soft U-hard U' when semi-static D/U assignment is informed, and informs of the number of slots and the number of symbols in the next slot for each resource direction.

At this time, in a slot to which the x2 and y2 have been indicated (informed), there may be some symbols for which directions have not been determined yet, and soft D/U may be defined for those symbols. For example, if x2 and y2 are indicated by a number larger than 0 and soft D/U is configured from the next slot, the corresponding symbols may all be defined as soft D/U.

Like hard D/U, soft D/U may also inform of the number of slots and symbols by using two parameters.

The second option (Opt2) applies the UE-specific method and defines RRC signaling that informs only of soft D/F/U when semi-static D/U assignment is informed. The second option may designate one slot and inform of the number of soft D/F/U symbols (index, number of symbols) within the corresponding slot.

ii) Method for Using Slot Format Table

As shown in Table 3 above, the proposed method may define a slot format in slot units by including not only hard D/F/U but also soft D/F/U, where soft D/F/U is defined as a donor node informs an JAB node of the slot format.

<Activation of Soft Resource>

1. Activation Signaling

If a soft resource is defined by a donor node, a parent node of an IAB node may activate the soft resource according to its own data load and the data load status of a child node. A method for activating a soft resource for this case will be described.

Activation of a Single Soft Resource

Resources designated as soft may be defined in particular units and may be activated according to one soft resource unit. 'One' soft resource set may be regarded as a group of contiguous soft resource symbols. A parent node may determine an index for each soft resource set and by separately informing its child node of a specific index, convert a soft resource set corresponding to the specific index to a resource that may be used when the child node operates as a DU. At this time, a method for separately informing of an index may use a new DCI format or inform of the index by adding a field to an existing DCI format. The SFI index is transmitted in the DCI format 2.0, which may be used to activate a soft resource set.

2) Activation of the Entire Soft Resources

If an activation signal is received, a soft resource may be activated only for one period. Or, a period to be activated may also be signaled.

Similarly, soft resources may be activated for a period of N. At this time, the N may be informed through an activation signal or predefined through separate RRC signaling. A method for separately informing of a period through an activation signal may use a new DCI format or inform of the period by adding a field to an existing DCI format 2. Activation Through Slot Format Indication Signaling A parent node may indicate, to a child node, a slot format that defines a resource direction clearly together with a soft region. A method for indicating a slot format may apply a method that uses the DCI format 2.0.

<Priority Rules for IAB Node>

An IAB node may receive both of the downlink/uplink (D/U) allocation from the viewpoint of a mobile terminal (MT) and the D/U allocation from the viewpoint of a distributed unit (DU).

Figure 24:
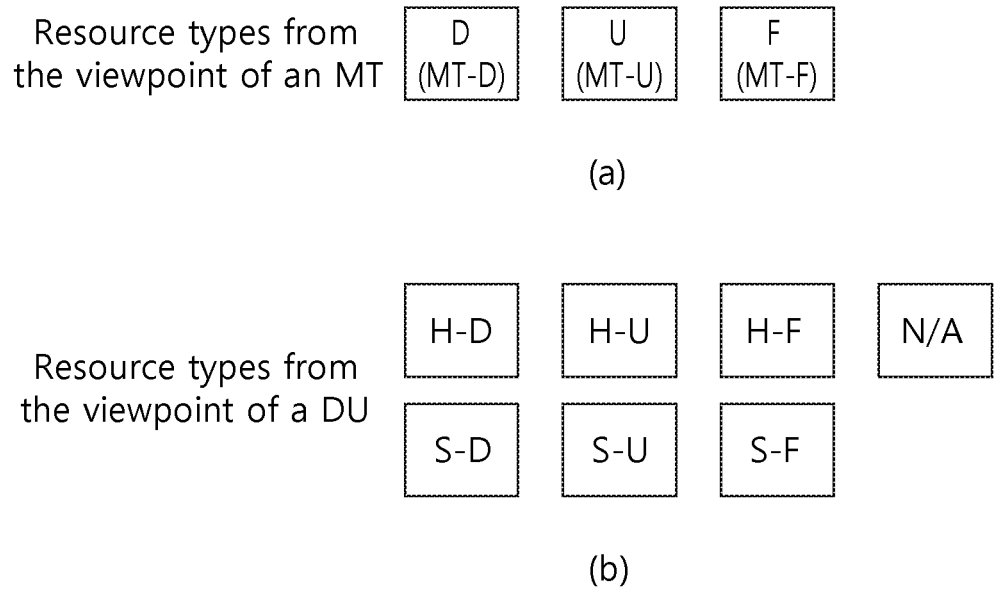
FIG. 24 illustrates resource types included in the D/U allocation from the viewpoint of an MT and resource types included in the D/U allocation from the viewpoint of a DU, which are received by an IAB node.

FIG. 24 illustrates resource types included in the D/U allocation from the viewpoint of an MT and resource types included in the D/U allocation from the viewpoint of a DU, which are received by an IAB node.

Referring to FIG. 24, the D/U allocation from the viewpoint of an MT includes downlink (D)/flexible (F)/uplink (U) as a resource type. A resource denoted by F may be a resource that may be used as D or U. In view of D/U allocation from the viewpoint of an MT, D according to the D/U allocation from the viewpoint of an MT may be denoted as MT-D, U as MT-U, and F as MT-F.

For D/U allocation from the viewpoint of a DU, hard D/F/U, soft D/F/U, and not-available (NA) may be indicated as a resource type.

A hard resource may be a resource always available in an indicated direction with respect to an IAB node and a child node, namely a DU child link.

A soft resource may be a resource of which the availability for the DU child link is controlled explicitly and/or implicitly by a parent node of the IAB node.

For example, a hard downlink (H-D) may represent a resource always available for an IAB node to transmit a signal to its child node, and a soft downlink (S-D) may represent a resource for transmission of a signal by the IAB node to its child node, which is controlled by a parent node of the IAB node.

A hard uplink (H-U) may represent a resource always available for the IAB node to receive a signal from the child node, and a soft uplink (S-U) may represent a resource for reception of a signal by the IAB node from the child node, which is controlled by the parent node.

A hard flexible (H-F) may represent a resource always flexible in a relationship between the IAB node and the child node, and a soft flexible (S-F) may represent a resource for which whether it is a flexible resource in the relationship between the IAB node and the child node is controlled by the parent node.

NA may represent a resource unavailable in the relationship between the IAB node and the child node.

Although D/U assignment in terms of an MT and D/U assignment in terms of a DU may be defined by the same numerology and parameters, they may be defined independently from each other. Even if the D/U assignment may be defined dependently or independently, it may be impossible for a donor node allocating resources to allocate resource directions that do not cause interference (that implements zero interference) completely to all of the nodes to which resources are allocated.

Therefore, if collision occurs between the D/U assignment in terms of an MT and the D/U assignment in terms of a DU, it is necessary to define a rule on which assignment an IAB node has to put priority for operation.

In the case of D (MT-D) of D/U assignment in terms of an MT, the following options may be considered.

1) Option 1: Method that does not count all of semi-static flexible (F) resources.

This option is related to a case where dynamic SFI is not configured, more specifically, a case where downlink resources are configured through RRC signaling while it is semi-static DL or semi-static flexible (F).

When dynamic SFI is configured, the option describes a case where semi-static DL or semi-static flexible (F) is configured with downlink resources through RRC signaling. At this time, when dynamic SFI is cancelled, the corresponding resources may be regarded as not-available (NA) or may still be regarded as MT-D. And in the case of a resource converted dynamically to D while it is semi-static flexible (F), since the aforementioned conversion may be unnoticed, the resource may not be regarded as MT-D.

2) Option 2: Method that regards all of the semi-static F/D as MT-D

Similar to the above, in the case of MT-U, F resource may include only the resource which has been changed to UL by RRC signaling or the F resource may be regarded as U. Or if the F resource is not informed by RRC signaling, all of the resources may be regarded as DL. Or MT-D and MT-U may be regarded as semi-static D or U, and MT-F (flexible) may be considered. Here, although descriptions are given with respect to the Option 1, the descriptions may also be applied to the Option 2 or to the case where only the semi-static D/U is taken into account.

Hard DU resources may have higher priority than the resources according to D/U assignment in terms of an MT and soft DU resources. In other words, if resources (or soft resources) according to D/U assignment in terms of an MT are configured with different directions from the hard resources, the hard resources may have higher priority, and a node or UE may perform an operation suitable for the directions of the hard resources.

Implicit determination of resources directions of soft resources may be performed as follows.

If a soft resource is not explicitly allocated to a UE by an RRC configuration or dynamic scheduling, the soft resource may be assumed to be used for a DU.

If a soft resource is explicitly allocated to a UE by an RRC configuration or dynamic scheduling, the soft resource may be assumed to be used for a UE.

<Rule 1>

Figure 25:
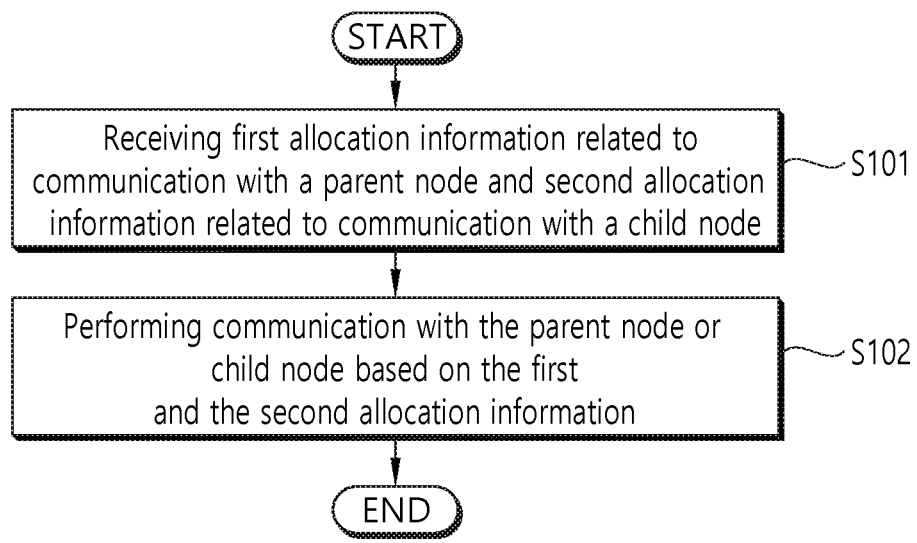
FIG. 25 illustrates a (IAB) node operation method according to one embodiment of the present disclosure.

FIG. 25 illustrates a (IAB) node operation method according to one embodiment of the present disclosure. FIG. 25 assumes a connection state in the IAB environment such as a parent node-(IAB) node-child node.

Referring to FIG. 25, an IAB node (in what follows, it is called a node for short) receives first allocation information related to communication with a parent node and second allocation information related to communication with a child node S101.

The first allocation information may inform of resource type of a specific resource as one of three, and the second allocation information informs of resource type of the specific resource as one of seven. For example, the first allocation information may be the D/U allocation from the viewpoint of an MT described above, and the second allocation information may be the D/U allocation from the viewpoint of a DU described above. As described above, the D/U allocation from the viewpoint of an MT may indicate (inform of) the resource type of a specific resource as one of downlink (D)/flexible (F)/uplink (U). Also, the D/U allocation from the viewpoint of a DU may indicate (inform of) the resource type of a specific resource as one of 7 types such as hard D/F/U, soft D/F/U, and not-available (NA). A node may receive the first and the second allocation information from the parent node.

The node performs communication with the parent node or child node based on the first and the second allocation information S102.

At this time, the resource type indicated (informed) by the first allocation information with respect to a specific resource may be different from or collide with the resource type indicated (informed) by the second allocation information. In this case, how to deal with the difference or collision may become a problem.

According to the present disclosure, when the second allocation information indicates a specific resource as a hard resource which is always available for communication with a child node, the specific resource may be used by the node for communication with the child node irrespective of the first allocation information.

Also, when the second allocation information indicates a resource as soft downlink, soft uplink, or soft flexible, if the resource is allocated to the node according to the first allocation information, the resource may be regarded as being used for communication with the parent node.

When the second allocation information indicates a resource as a soft resource (for example, soft downlink, soft uplink, or soft flexible), if no particular explicit/implicit indication/signaling about availability of the resource for communication (namely, DU operation) with a child node is provided, the resource may be used for communication (MT operation) with the parent node.

by the first allocation information, the resource may be regarded as being used for communication with the child node.

When the second allocation information indicates a resource as a soft resource (for example, soft downlink, soft uplink, or soft flexible), if no particular explicit/implicit indication/signaling about availability of the resource for communication (namely the MT operation) with the parent node is provided, the resource may be used for communication (DU operation) with the child node.

For example, in the TDM operation, transmission of an IAB node from the viewpoint of a DU and transmission of the IAB node from the viewpoint of an MT may not be performed simultaneously; also, reception from the viewpoint of the DU and reception from the viewpoint of the MT may not be performed simultaneously. The table below shows which operation a node (IAB node) performs when the D/U allocation (for the sake of convenience, it is called the DU configuration) from the viewpoint of the DU and the D/U allocation (for the sake of convenience, it is called the MT configuration) from the viewpoint of the MT are given.

TABLE 13

| DU Configuration | MT configuration | | |
|---|---|---|---|
| | DL | UL | F |
| DL-H | DU: Tx<br>MT: NULL | DU: Tx<br>MT: NULL | DU: Tx<br>MT: NULL |
| DL-S | When DU resoruce: IA<br>DU: Tx<br>MT: NULL<br>When DU resource: INA<br>DU: NULL<br>MT: Rx | When DU resource: IA<br>DU: Tx<br>MT: NULL<br>When DU resource: INA<br>If DU: NULL<br>MT: Tx | When DU resource: IA<br>DU: Tx<br>MT: NULL<br>When DU resource: INA<br>If DU: NULL<br>MT: Tx/Rx |
| UL-H | DU: Rx<br>MT: NULL | DU: Rx<br>MT: NULL | DU: Rx<br>MT: NULL |
| UL-S | When DU resource: IA<br>DU: Rx<br>MT: NULL<br>When DU resource: INA<br>DU: NULL<br>MT: Rx | When DU resource: IA<br>DU: Rx<br>MT: NULL<br>When DU resource: INA<br>DU: NULL<br>MT: Tx | When DU resource: IA<br>DU: Rx<br>MT: NULL<br>When DU resource: INA<br>DU: NULL<br>MT: Tx/Rx |
| F-H | DU: Tx/Rx<br>MT: NULL | DU: Tx/Rx<br>MT: NULL | DU: Tx/Rx<br>MT: NULL |
| F-S | When DU resource: IA<br>DU: Tx/Rx<br>MT: NULL<br>When DU resource: INA<br>DU: NULL<br>MT: Rx | When DU resource: IA<br>DU: Tx/Rx<br>MT: NULL<br>When DU resource: INA<br>DU: NULL<br>MT: Tx | When DU resource: IA<br>DU: Tx/Rx<br>MT: NULL<br>When DU resource: INA<br>DU: NULL<br>MT: Tx/Rx |
| NA | DU: NULL<br>MT: Rx | DU: NULL<br>MT: Tx | DU: NULL<br>MT: Tx/Rx |

The MT operation at a soft resource may be allowed not only in the presence of the explicit indication but also in the absence of the explicit indication. Then more occasions for monitoring a PDCCH from a parent node will be given to the IAB node.

If the MT operation at a soft resource is not allowed in the absence of an explicit indication, a problem may occur when the NA resource is not available for DU configuration of the IAB node. In this case, since the IAB is unable to monitor the PDCCH, it may not receive the L1 signal for configuring available resources with respect to the DU soft resource, which may cause a problem for communication with the parent node.

Similarly, when the second allocation information indicates a resource as soft downlink, soft uplink, or soft flexible, if the resource is not explicitly allocated to the node In the table above, DU may represent the operation between an IAB node and a child node, and MT may represent the operation between the IAB node and a parent node.

More specifically, in the table above, "MT: Tx" may indicate that the MT (child node) should transmit if scheduled. "DU: Tx" may indicate that the IAB node (namely, DU) may transmit. "MT: Rx" may indicate that the MT should be able to receive (if there is anything to receive). "DU: Rx" may indicate that the IAB node (DU) may schedule uplink transmissions form child nodes or UEs. "MT: Tx/Rx" may indicate that the MT (child node) should transmit if scheduled and should be able to receive, but not simultaneously. "DU: Tx/Rx" may indicate that the DU may transmit and may schedule uplink transmission form child nodes and UEs, but not simultaneously. "IA" may indicate that the IAB node (DU resource) may be explicitly or implicitly indicated as available.

"INA" may indicate that the IAB node (DU resource) is explicitly or implicitly indicated as not available.

"MT: NULL" may indicate that the MT does not transmit and does not have to be able to receive. "DU: NULL" may indicate that the IAB node (DU) does not transmit and does not schedule uplink transmission from child nodes and UEs.

The table above may be related to the IAB environment that does not support the full-duplex operation.

In what follows, when collision occurs on the resource type with respect to the same resource by D/U assignment in terms of an MT (first assignment information) and D/U assignment in terms of a DU (second assignment information), in which way the collision is dealt with will be described with reference to more specific examples.

1. The Case of Collision with MT-D

DU-hard D: It may be operated with priority on the DU-hard D. In other words, an MT-D resource may be regarded as unavailable in terms of an MT.

DU-soft D: It may be operated with priority on the MT-D. In other words, a DU-soft D resource may be regarded as unavailable.

DU-hard D: It may be operated with priority on DU-hard U. In other words, an MT-D resource may be regarded as MT-D/DU-U when IAB supports FDM/SDM, otherwise the corresponding resource (MT-D) may be regarded as unavailable.

DU-soft U: It may be operated with priority on MT-D. In other words, an MT-D resource may be regarded as MT-D/DU-U when IAB supports FDM/SDM, otherwise the corresponding resource (DU-soft U) may be regarded as unavailable.

DU-hard F: Since the corresponding resource is flexible at an IAB node, if IAB supports FDM/SDM, it may be configured as MT-D/DU-U according to MT-D, otherwise it is configured as a DU resource, and MT may be assumed to be unavailable.

DU-soft F: The corresponding resource has priority on the MT-D, and if IAB supports FDM/SDM, it may be configured as MT-D/DU-U according to MT-D, otherwise it is configured as an MT resource, and DU may be assumed to be unavailable.

DU-unavailable: The corresponding case may assume an MT function of the MT-D. Since a DU does not use the corresponding resource, the MT function may be performed without priority, which may be applied for those resources corresponding to DU-unavailable. A similar method may also be applied to MT-U.

2. The Case of Collision with MT-U

DU-hard D: It may be operated with priority on DU-hard D.

DU-soft D: It may be operated with priority on MU-U.

DU-hard U: It may be operated with priority on DU-hard U.

DU-soft U: It may be operated with priority on MU-U.

Meanwhile, although D/U assignments may simply collide with each other, they may collide with a CORESET, CSI-RS, grant free resources, and semi-static resource configuration such as PDSCH, PUCCH, and PUSCH configured by an upper layer.

1) The case of collision with MT downlink configuration (for example, CORESET, CSI-RS, and PDSCH configured by an upper layer) in an MT-F DU-hard D: It may be operated with priority on DU-hard D.

DU-soft D: It may be operated with priority on MT-downlink configuration.

DU-hard U: It may be operated with priority on DU-hard U.

DU-soft U: It may be operated with priority on MT-downlink configuration.

2) The case of collision with MT uplink configuration (for example, grant free resource and PUCCH and PUSCH configured by an upper layer) in an MT-F DU-hard D: It may be operated with priority on DU-hard D.

DU-soft D: It may be operated with priority on MT-U.

DU-hard U: It may be operated with priority on DU-hard U.

DU-soft U: It may be operated with priority on MT-uplink configuration.

<Rule 2>

When MT-D collides with DU-hard D/U, and DU-soft D/U, it may be operated so that priority is always set on the MT-D. In other words, it may be regarded as MT-D for operation.

When MT-U collides with DU-hard D/U, and DU-soft D/U, it may be operated so that priority is always set on the MT-U. In other words, it may be regarded as MT-U for operation.

When MT downlink configuration within MT-F (for example, CORESET, CSI-RS, and PDSCH configured by an upper layer) collides with DU-hard D/U and DU-soft D/U, the option 1 always operates with priority on the MT-downlink configuration, and the option 2 always operates with priority on the DU assignment.

When MT uplink configuration within MT-F (for example, grant free resource and PUCCH and PUSCH configured by an upper layer) collides with DU-hard D/U and DU-soft D/U, the option 1 always operates with priority on the MT-uplink configuration, and the option 2 always operates with priority on the DU assignment.

<Rule 3>

When MT D/U collides with DU hard F, the option 1 operates as an MT since availability of DU hard F is not clear. In other words, priority is given to MT D/U. The option 2 ignores D/U of the MT but operates as a DU since the DU may use DU hard F for scheduling.

When MT D/U collides with DU soft F, it may be operated as an MT.

When MT D/U collides with a DU not-available resource, it may be operated as an MT.

<Rule 4>

Between an MT and a node (DU), 1) Option 1: since a connection to a parent node always has higher priority, MT operation may always have priority over DU operation. 2) Option 2: since a connection to a child node always has higher priority for service maintenance, the DU operation may always have priority over the MT operation.

<Rule 5>

Between an MT and a DU soft resource, Option 1: since a soft resource may be considered to be an unavailable resource when DU soft is maintained, MT operation may have priority. Option 2: since it is not known when a parent node activates a soft resource and it may be the case that an activation signal has actually arrived but has been missed, the soft resource may not perform MT operation.

Between an MT and a DU hard resource, Option 1: since a connection to a parent node always has higher priority, MT operation may always have priority over DU operation. Or, Option 2: since a connection to a child node always has higher priority for service maintenance, the DU operation may always have priority over the MT operation.

<Rule 6>

Between MT resource configuration within MT F and a DU soft resource, Option 1: since a connection to a parent node always has higher priority, it may always be operated according to the MT resource configuration. Or, Option 2: since a connection to a child node always has higher priority for service maintenance, the DU operation may always have priority over the MT operation.

Between MT resource configuration and a DU F resource, Option 1: since a connection to a parent node always has higher priority, it may always be operated according to the MT resource configuration. Or, Option 2: since a connection to a child node always has higher priority for service maintenance and scheduling may be performed on the DU F, the MT resource configuration may be ignored.

<Priority Rule for Child Node of DU>

Since it is a soft resource in view of a DU, it is important whether a DU may configure the corresponding resource with the rule. Also, although a DU has a soft resource configuration, it is equally important whether an MT may also check the soft resource configuration.

A soft resource may not be used immediately by a DU but may be regarded as an available resource. Also, since resource configuration itself may be set irrespective of whether the corresponding resource is actually available, it may not be assumed that no configuration is available for a soft resource period. In other words, a DU may configure a semi-static resource such as a CORESET, CSI-RS, grant free resource, and PDSCH, PUCCH, and PUSCH configured by an upper layer separately from a soft resource (or a donor node may provide the configuration on behalf of the corresponding DU), position of the configuration resource may be overlapped with the soft resource.

If a child node (or UE) of the DU knows the D/F/U resource structure to be used by the DU (including soft and NA (not-available)) and also has received the corresponding configuration, operations that may be taken are as follows:

1) A child node (or UE) of a DU may perform the configuration corresponding to the downlink directly for the case of soft D. 2) In the presence of a configuration corresponding to the uplink for the case of soft U, a child node (or UE) of the DU may prepare for transmission of the corresponding uplink. At this time, during the preparation, if there is no indication such as hard D before the transmission (a transmission period taking into account TA), the corresponding uplink is not transmitted but may be transmitted if an indication such as the hard D is given or the corresponding uplink is scheduled.

3) A child node (or UE) of a DU may directly perform the 'configuration corresponding to the downlink' existing in soft F and in the presence of the 'configuration corresponding to the uplink', may prepare for transmission of the corresponding uplink. At this time, during the preparation, if there is no indication such as hard D before the transmission (a transmission period taking into account TA), the corresponding uplink is not transmitted but may be transmitted if an indication such as the hard D is given or the corresponding uplink is scheduled.

<Not-Available Resource>

A not-available resource may be defined as a resource unavailable for a DU when an IAB node operates to perform the role of the DU. Different from a soft resource, a not-available resource may be defined as a resource that may not be used at all even if the DU receives additional signaling. This definition may be made by a donor node and transmitted, where an IAB node may utilize the remaining resources arbitrarily except for the corresponding resource. If there exists a soft resource and the soft resource is activated by its parent node, the soft resource may be used.

1. Location of not-Available Resource

Figure 26:
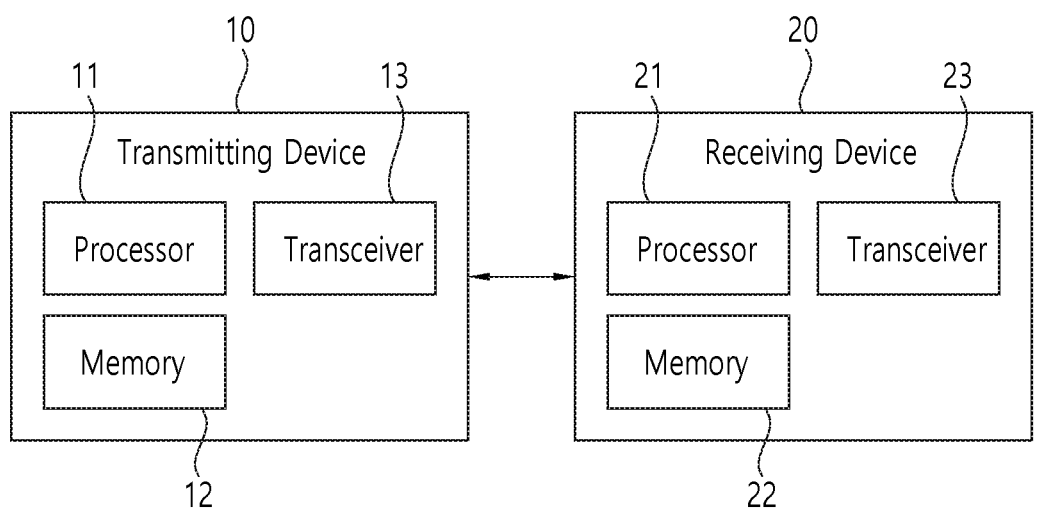
FIG. 26 is a block diagram showing components of a transmitting device 10 and a receiving device 20 for implementing the present disclosure.

An IAB node may perform both roles of an MT and DU; and D/U assignment in terms of an MT may be different from D/U assignment in terms of a DU. However, it is not necessary to inform of a resource unavailable in terms of the DU through the D/U assignment in terms of the MT. This is so because in the MT operation, it suffices to operate as scheduled by a parent node. Defining a not-available resource in terms of the DU within a resource for which whether an MT operation may be performed or not is unclear may minimize ambiguity in both of the MT and DU operations. In other words, a not-available resource for a DU may be defined by a donor node within a flexible resource in terms of an MT FIG. 26 is a block diagram showing components of a transmitting device 10 and a receiving device 20 for implementing the present disclosure. Here, the transmitting device and the receiving device may be a base station and a terminal.

The transmitting device 10 and the receiving device 20 may respectively include transceivers 13 and 23 capable of transmitting or receiving radio frequency (RF) signals carrying information, data, signals and messages, memories 12 and 22 for storing various types of information regarding communication in a wireless communication system, and processors 11 and 21 connected to components such as the transceivers 13 and 23 and the memories 12 and 22 and configured to control the memories 12 and 22 and/or the transceivers 13 and 23 such that the corresponding devices perform at least one of embodiments of the present disclosure.

The memories 12 and 22 can store programs for processing and control of the processors 11 and 21 and temporarily store input/output information. The memories 12 and 22 may be used as buffers.

The processors 11 and 21 generally control overall operations of various modules in the transmitting device and the receiving device. Particularly, the processors 11 and 21 can execute various control functions for implementing the present disclosure. The processors 11 and 21 may be referred to as controllers, microcontrollers, microprocessors, microcomputers, etc. The processors 11 and 21 can be realized by hardware, firmware, software or a combination thereof. When the present disclosure is realized using hardware, the processors 11 and 21 may include ASICs (application specific integrated circuits), DSPs (digital signal processors), DSPDs (digital signal processing devices), PLDs (programmable logic devices), FPGAs (field programmable gate arrays) or the like configured to implement the present disclosure. When the present disclosure is realized using firmware or software, the firmware or software may be configured to include modules, procedures or functions for performing functions or operations of the present disclosure, and the firmware or software configured to implement the present disclosure may be included in the processors 11 and 21 or stored in the memories 12 and 22 and executed by the processors 11 and 21.

The processor 11 of the transmitting device 10 can perform predetermined coding and modulation on a signal and/or data to be transmitted to the outside and then transmit the signal and/or data to the transceiver 13. For example, the processor 11 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 13 may include an oscillator for frequency up-conversion. The transceiver 13 may include one or multiple transmission antennas.

The signal processing procedure of the receiving device 20 may be reverse to the signal processing procedure of the transmitting device 10. The transceiver 23 of the receiving device 20 can receive RF signals transmitted from the transmitting device 10 under the control of the processor 21. The transceiver 23 may include one or multiple reception antennas. The transceiver 23 can frequency-down-convert signals received through the reception antennas to restore baseband signals. The transceiver 23 may include an oscillator for frequency down conversion. The processor 21 can perform decoding and demodulation on RF signals received through the reception antennas to restore data that is intended to be transmitted by the transmitting device 10.

The transceivers 13 and 23 may include one or multiple antennas. The antennas can transmit signals processed by the transceivers 13 and 23 to the outside or receive RF signals from the outside and deliver the RF signal to the transceivers 13 and 23 under the control of the processors 11 and 21 according to an embodiment of the present disclosure. The antennas may be referred to as antenna ports. Each antenna may correspond to one physical antenna or may be configured by a combination of a plurality of physical antenna elements. A signal transmitted from each antenna cannot be decomposed by the receiving device 20. A reference signal (RS) transmitted corresponding to an antenna defines an antenna from the viewpoint of the receiving device 20 and can allow the receiving device 20 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 27:
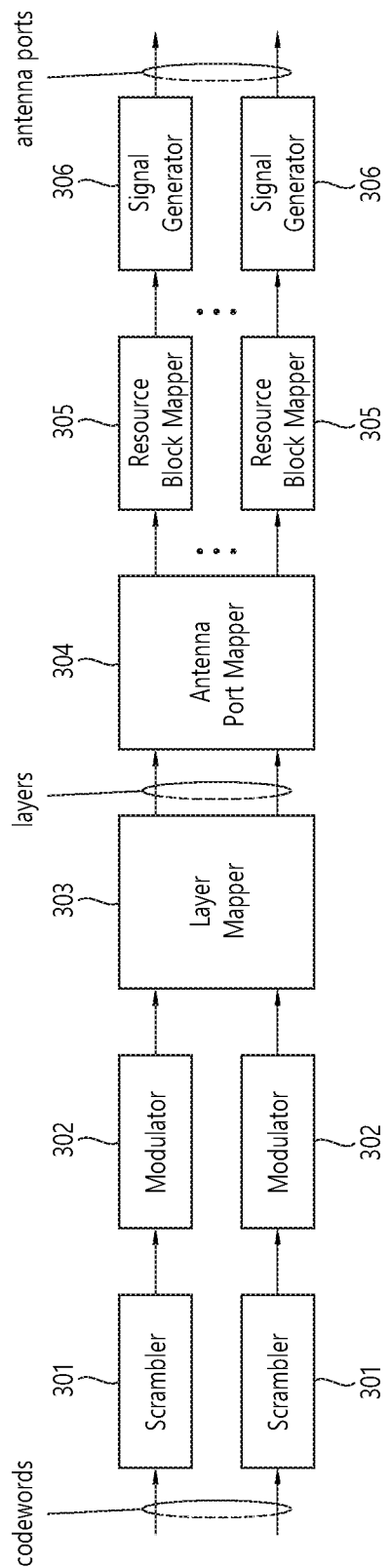
FIG. 27 illustrates an example of a signal processing module structure in the transmitting device 10.

FIG. 27 illustrates an example of a signal processing module structure in the transmitting device 10. Here, signal processing can be performed by a processor of a base station/terminal, such as the processor 11 of FIG. 26.

Referring to FIG. 27, the transmitting device 10 included in a terminal or a base station may include scramblers 301, modulators 302, a layer mapper 303, an antenna port mapper 304, resource block mappers 305 and signal generators 306.

The transmitting device 10 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 28:
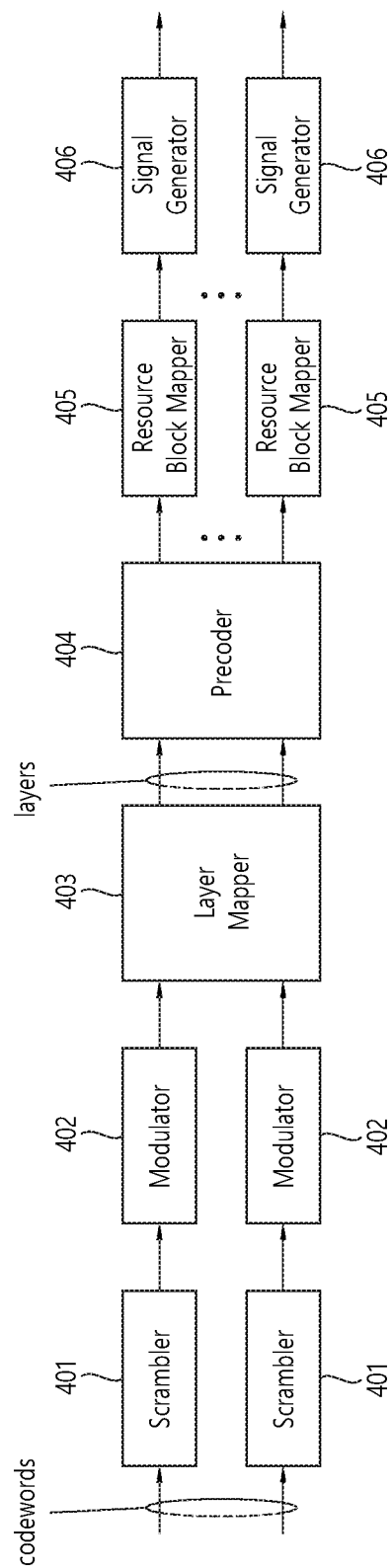
FIG. 28 illustrates another example of the signal processing module structure in the transmitting device 10.

FIG. 28 illustrates another example of the signal processing module structure in the transmitting device 10. Here, signal processing can be performed by a processor of a terminal/base station, such as the processor 11 of FIG. 26.

Referring to FIG. 28, the transmitting device 10 included in a terminal or a base station may include scramblers 401, modulators 402, a layer mapper 403, a precoder 404, resource block mappers 405 and signal generators 406.

The transmitting device 10 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an NxM precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter. The signal processing procedure of the receiving device 20 may be reverse to the signal processing procedure of the transmitting device. Specifically, the processor 21 of the transmitting device 10 decodes and demodulates RF signals received through antenna ports of the transceiver 23. The receiving device 20 may include a plurality of reception antennas, and signals received through the reception antennas are restored to baseband signals, and then multiplexed and demodulated according to MIMO to be restored to a data string intended to be transmitted by the transmitting device 10.

The receiving device 20 may include a signal restoration unit which restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit which removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 29:
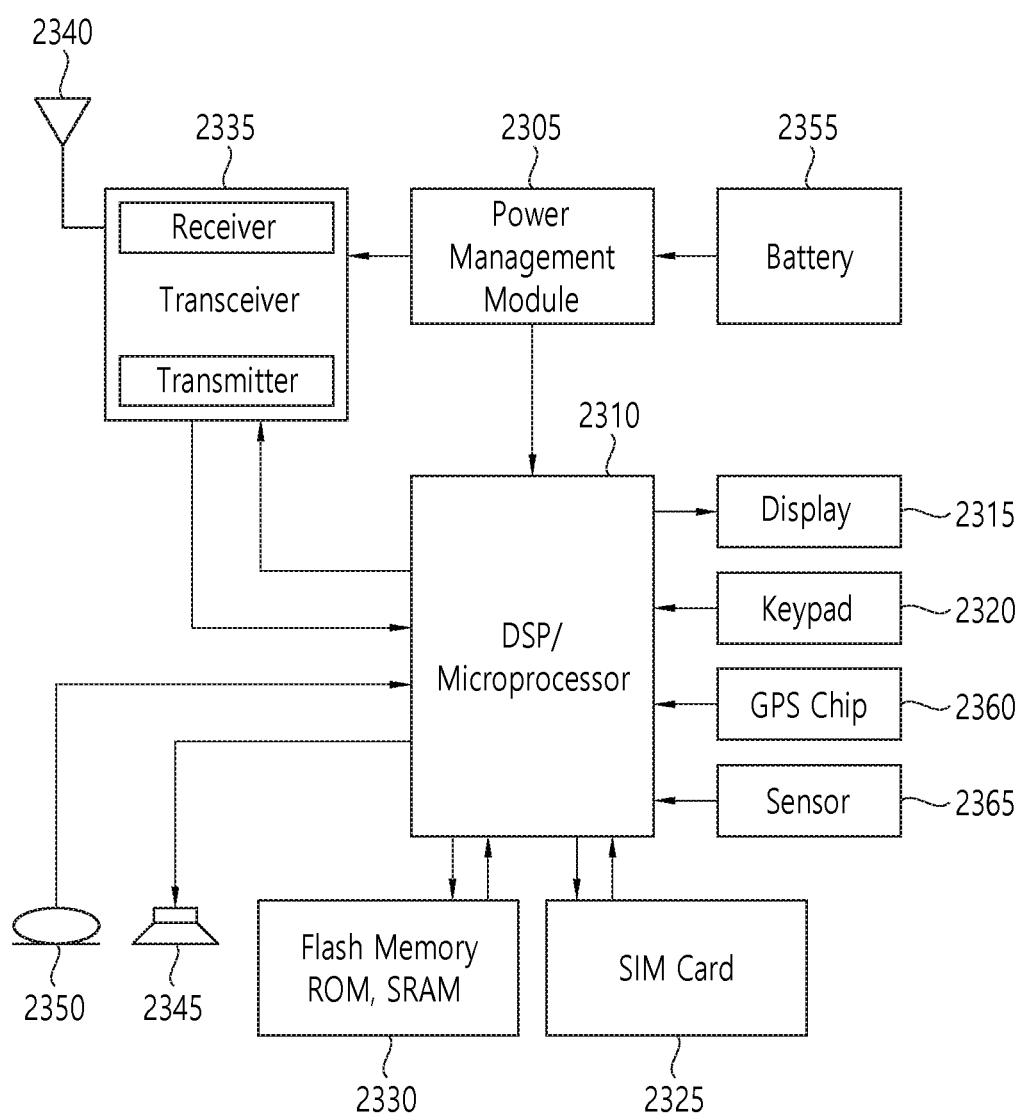
FIG. 29 illustrates an example of a wireless communication device according to an implementation example of the present disclosure.

FIG. 29 illustrates an example of a wireless communication device according to an implementation example of the present disclosure.

Referring to FIG. 29, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 29 may be the processors 11 and 21 in FIG. 26.

The memory 2330 is connected to the processor 231 and stores information related to operations of the processor. The memory may be located inside or outside the processor and connected to the processor through various techniques such as wired connection and wireless connection. The memory 2330 in FIG. 29 may be the memories 12 and 22 in FIG. 26.

A user can input various types of information such as telephone numbers using various techniques such as pressing buttons of the keypad 2320 or activating sound using the microphone 250. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 29 may be the transceivers 13 and 23 in FIG. 26.

Although not shown n FIG. 29, various components such as a camera and a universal serial bus (USB) port may be additionally included in the terminal. For example, the camera may be connected to the processor 2310.

FIG. 29 is an example of implementation with respect to the terminal and implementation examples of the present disclosure are not limited thereto. The terminal need not essentially include all the components shown in FIG. 29. That is, some of the components, for example, the keypad 2320, the GPS chip 2360, the sensor 2365 and the SIM card 2325 may not be essential components. In this case, they may not be included in the terminal.

Figure 30:
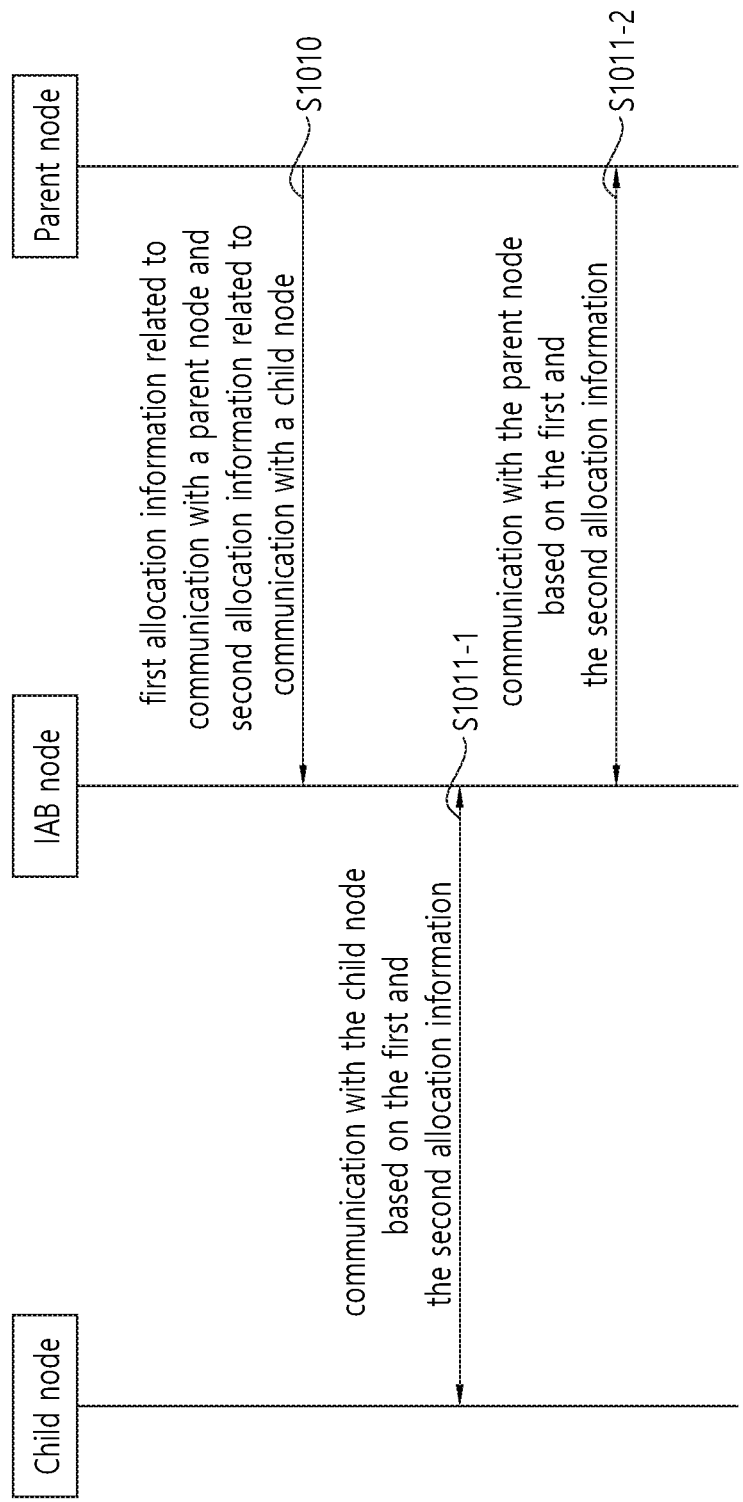
FIG. 30 illustrates a node operation method according to one embodiment of the present disclosure.

FIG. 30 illustrates a node operation method according to one embodiment of the present disclosure.

Referring to FIG. 30, the IAB node receives first allocation information related to communication with a parent node and second allocation information from the parent node related to communication with a child node S1010.

The IAB node performs communication with the child node S1011-1 and communication with the parent node S1011-2 based on the first and the second allocation information.

At this time, as described earlier with reference to FIG. 25, if the second allocation information indicates a specific resource as a hard resource always available for communication with the child node, the specific resource may be used for communication with the child node irrespective of the first allocation information.

Also, when the second allocation information indicates a resource as soft downlink, soft uplink, or soft flexible, if the resource is allocated to the node according to the first allocation information, the resource may be regarded as being used for communication with the parent node.

Similarly, when the second allocation information indicates a resource as soft downlink, soft uplink, or soft flexible, if the resource is not explicitly allocated to the node according to the first allocation information, the resource may be regarded as being used for communication with the child node.

The methods described above may be performed by at least one of the apparatus of FIGS. 26 to 29.

What is claimed is:

1. A method performed by a node operating in a wireless communication system, the method comprising:
    receiving first allocation information related to communication with a parent node and second allocation information related to communication with a child node; and
    performing communication with the parent node or communication with the child node based on the first and the second allocation information,
    wherein, based on the second allocation information informing a specific resource as a hard resource among the hard resource, a soft resource and an unavailable resource, the specific resource is used for communication with the child node irrespective of the first allocation information,
    wherein the second allocation information informs a resource type of the specific resource as one of hard downlink, soft downlink, hard uplink, soft uplink, hard flexible, soft flexible, and unavailable, and
    wherein the second allocation information informing the resource type as unavailable indicates that the specific resource is a resource that is not used in a relationship between the node and the child node.

2. The method of claim 1, wherein the first allocation information informs of resource type of the specific resource as one of downlink, uplink, and flexible.

3. The method of claim 1, wherein the second allocation information informing the resource type as hard downlink indicates that the specific resource is a resource which can be always available for the node to transmit a signal to the child node, and
    wherein the second allocation information informing the resource type as soft downlink indicates that the specific resource is a resource for which transmission of a signal by the node to the child node is controlled by the parent node.

4. The method of claim 1, wherein the second allocation information informing the resource type as hard uplink indicates that the specific resource is a resource which can be always available for the node to receive a signal from the child node, and
    wherein the second allocation information informing the resource type as soft uplink indicates that the specific resource is a resource for which reception of a signal by the node from the child node is controlled by the parent node.

5. The method of claim 1, wherein the second allocation information informing the resource type as hard flexible indicates that the specific resource is always a flexible resource in a relationship between the node and the child node, and
    wherein the second allocation information informing the resource type as soft flexible indicates that the specific resource is a resource for which whether the specific resource is a flexible resource in a relationship between the node and the child node is controlled by the parent node.

6. The method of claim 1, wherein the second allocation information informing the resource type as unavailable indicates that the specific resource is a resource that is not used in a relationship between the node and the child node.

7. The method of claim 1, wherein, based on the second allocation information informing a resource type of a resource as soft downlink, soft uplink, or soft flexible, and based on the resource being allocated to the node according to the first allocation information, the resource is regarded as being used for communication with the parent node.

8. The method of claim 1, wherein, based on the second allocation information informing a resource type of a resource as soft downlink, soft uplink, or soft flexible, and based on the resource being not allocated to the node according to the first allocation information, the resource is regarded as being used for communication with the child node.

9. The method of claim 1, wherein the first and the second allocation information are received from the parent node.

10. The method of claim 1, wherein the child node is a UE connected to the node.

11. The method of claim 1, wherein, based on the second allocation information informing a resource type of a resource as soft downlink, soft uplink, or soft flexible, based on no particular explicit or implicit indication about availability of the resource for communication with the child node being provided, the resource is used for communication with the parent node.

12. A node, comprising:
    a transceiver transmitting and receiving a radio signal; and
    a processor operating in conjunction with the transceiver, wherein the processor is configured to:
    receive first allocation information related to communication with a parent node and second allocation information related to communication with a child node; and
    perform communication with the parent node or communication with the child node based on the first and the second allocation information,
    wherein, based on the second allocation information informing a specific resource as a hard resource among the hard resource, a soft resource and an unavailable resource, the specific resource is used for communication with the child node irrespective of the first allocation information,
    wherein the second allocation information informs a resource type of the specific resource as one of hard downlink, soft downlink, hard uplink, soft uplink, hard flexible, soft flexible, and unavailable, and
    wherein the second allocation information informing the resource type as unavailable indicates that the specific resource is a resource that is not used in a relationship between the node and the child node.

13. The node of claim 12, wherein the first allocation information informs a resource type of the specific resource as one of downlink, uplink, and flexible.

14. The node of claim 12, wherein the second allocation information informing the resource type as hard downlink indicates that the specific resource is a resource which can be always available for the node to transmit a signal to the child node, and
    wherein the second allocation information informing the resource type as soft downlink indicates that the specific resource is a resource for which transmission of a signal by the node to the child node is controlled by the parent node.

15. The node of claim 12, wherein the second allocation information informing the resource type as hard uplink indicates that the specific resource is a resource which can be always available for the node to receive a signal from the child node, and
wherein the second allocation information informing the resource type as soft uplink indicates that the specific resource is a resource for which reception of a signal by the node from the child node is controlled by the parent node.

16. The node of claim 12, wherein the second allocation information informing the resource type as hard flexible indicates that the specific resource is always a flexible resource in a relationship between the node and the child node, and
wherein the second allocation information informing the resource type as soft flexible indicates that the specific resource is a resource for which whether the specific resource is a flexible resource in a relationship between the node and the child node is controlled by the parent node.

17. The node of claim 12, wherein the first and the second allocation information are received from the parent node.

18. An apparatus configured to control a node to operate in a wireless communication system, the apparatus comprising:

at least one processor; and
at least one computer memory operably connectable to the at least one processor and storing instructions that, when executed by the at least one processor, perform operations comprising:
receiving first allocation information related to communication with a parent node and second allocation information related to communication with a child node; and
performing communication with the parent node or communication with the child node based on the first and the second allocation information,
wherein, based on the second allocation information informing a specific resource as a hard resource among the hard resource, a soft resource and an unavailable resource, the specific resource is used for communication with the child node irrespective of the first allocation information,
wherein the second allocation information informs a resource type of the specific resource as one of hard downlink, soft downlink, hard uplink, soft uplink, hard flexible, soft flexible, and unavailable, and
wherein the second allocation information informing the resource type as unavailable indicates that the specific resource is a resource that is not used in a relationship between the node and the child node.

* * * * *